United States Patent
Davies et al.

(10) Patent No.: US 8,966,550 B2
(45) Date of Patent: *Feb. 24, 2015

(54) HOME COMMUNICATION SYSTEMS

(75) Inventors: David B. Davies, Lawrenceville, GA (US); Samuel H. Russ, Lawrenceville, GA (US); Irvan J. Krantzler, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/056,812

(22) Filed: Mar. 27, 2008

(65) Prior Publication Data
US 2008/0201758 A1     Aug. 21, 2008

Related U.S. Application Data

(63) Continuation of application No. 10/437,556, filed on May 14, 2003, now Pat. No. 7,360,235, which is a continuation-in-part of application No. 10/342,670, filed on Jan. 15, 2003, now Pat. No. 7,908,625, which (Continued)

(51) Int. Cl.
*H04N 7/18* (2006.01)
*H04N 21/482* (2011.01)
(Continued)

(52) U.S. Cl.
CPC ......... *H04N 21/4821* (2013.01); *H04N 5/4403* (2013.01); *H04N 5/44513* (2013.01); *H04N 5/44543* (2013.01); *H04N 5/76* (2013.01); *H04N 5/775* (2013.01); *H04N 7/106* (2013.01); *H04N 7/17318* (2013.01); *H04N 21/4147* (2013.01); *H04N 21/4312* (2013.01);

(Continued)

(58) Field of Classification Search
USPC ................................. 725/74, 78, 80, 82, 85
See application file for complete search history.

(56) References Cited

U.S. PATENT DOCUMENTS

| 4,215,366 A | 7/1980 | Davidson ...................... 380/235 |
| 4,290,081 A | 9/1981 | Foerster |

(Continued)

FOREIGN PATENT DOCUMENTS

| CA | 2501107 | 1/2011 |
| EP | 0 325 331 | 7/1989 |

(Continued)

OTHER PUBLICATIONS

Scientific-Atlanta, Inc. Pending U.S. Appl. No. 10/008,581, filed Nov. 13, 2001, entitled "Network Subscriber Television Distribution," Inventors: Samuel H. Russ, David B. Lett, Jonathan A. Robinson, and Michael A. Gual.

(Continued)

*Primary Examiner* — Ngoc Vu
(74) *Attorney, Agent, or Firm* — Merchant & Gould

(57) ABSTRACT

Systems and methods are disclosed of a network including a primary device, a plurality of remote devices, and a shared peripheral device. The network allows the remote devices to operate the peripheral device, such as a DVD player, VCR, or camcoder, via the primary device and the network. The peripheral device is typically connected to the primary device and shared among all devices. The network also includes a splitter/isolation module (SIM) that routes the signals between the primary device and the plurality of remote devices.

20 Claims, 8 Drawing Sheets

Related U.S. Application Data is a continuation-in-part of application No. 10/403,485, filed on Mar. 31, 2003, now abandoned.

(60) Provisional application No. 60/418,412, filed on Oct. 15, 2002, provisional application No. 60/416,155, filed on Oct. 4, 2002.

(51) Int. Cl.

| | |
|---|---|
| H04N 5/44 | (2011.01) |
| H04N 5/445 | (2011.01) |
| H04N 5/76 | (2006.01) |
| H04N 5/775 | (2006.01) |
| H04N 7/10 | (2006.01) |
| H04N 7/173 | (2011.01) |
| H04N 21/4147 | (2011.01) |
| H04N 21/431 | (2011.01) |
| H04N 21/433 | (2011.01) |
| H04N 21/436 | (2011.01) |
| H04N 21/442 | (2011.01) |
| H04N 21/45 | (2011.01) |
| H04N 21/472 | (2011.01) |
| H04N 21/475 | (2011.01) |
| H04N 21/485 | (2011.01) |

(52) U.S. Cl.
CPC ...... *H04N 21/4314* (2013.01); *H04N 21/4334* (2013.01); *H04N 21/436* (2013.01); *H04N 21/43615* (2013.01); *H04N 21/43622* (2013.01); *H04N 21/44231* (2013.01); *H04N 21/4532* (2013.01); *H04N 21/47214* (2013.01); *H04N 21/4751* (2013.01); *H04N 21/4753* (2013.01); *H04N 21/4755* (2013.01); *H04N 21/482* (2013.01); *H04N 21/485* (2013.01)
USPC .................................. 725/82; 725/80

(56) References Cited

U.S. PATENT DOCUMENTS

| | | | | |
|---|---|---|---|---|
| 4,439,784 A | | 3/1984 | Furukawa et al. | |
| 4,535,355 A | | 8/1985 | Arn et al. | 380/212 |
| 4,540,958 A | | 9/1985 | Neyens et al. | |
| 4,578,533 A | | 3/1986 | Pierce | 379/93.31 |
| 4,644,526 A | | 2/1987 | Wu | 370/295 |
| 4,686,564 A | | 8/1987 | Masuko et al. | 725/120 |
| 4,706,121 A | | 11/1987 | Young | 348/27 |
| 4,751,578 A | | 6/1988 | Reiter et al. | 348/564 |
| 4,885,803 A | | 12/1989 | Hermann et al. | |
| 4,907,079 A | | 3/1990 | Turner et al. | |
| 4,908,713 A | | 3/1990 | Levine | 386/83 |
| 4,916,532 A | | 4/1990 | Streck et al. | 348/723 |
| 4,963,994 A | | 10/1990 | Levine | 386/83 |
| 4,963,995 A | * | 10/1990 | Lang | 386/285 |
| 5,010,299 A | | 4/1991 | Nishizawa et al. | |
| 5,010,399 A | | 4/1991 | Goodman et al. | |
| 5,038,211 A | | 8/1991 | Hallenbeck | 348/460 |
| 5,048,054 A | | 9/1991 | Eyuboglu et al. | 375/222 |
| 5,155,591 A | | 10/1992 | Wachob | 725/35 |
| 5,168,372 A | | 12/1992 | Sweetser | 725/29 |
| 5,251,074 A | | 10/1993 | Hamma et al. | |
| 5,253,066 A | | 10/1993 | Vogel | 725/28 |
| 5,293,357 A | | 3/1994 | Hallenbeck | 725/39 |
| 5,294,981 A | | 3/1994 | Yazolino et al. | |
| 5,381,449 A | | 1/1995 | Jasper et al. | 375/298 |
| 5,406,626 A | | 4/1995 | Ryan | |
| 5,412,416 A | | 5/1995 | Nemirofsky | |
| 5,479,268 A | | 12/1995 | Young et al. | 386/83 |
| 5,481,542 A | | 1/1996 | Logston et al. | 725/131 |
| 5,508,815 A | | 4/1996 | Levine | 386/83 |
| 5,515,377 A | | 5/1996 | Horne et al. | 370/395.64 |
| 5,524,051 A | | 6/1996 | Ryan | |
| 5,553,211 A | | 9/1996 | Uotani | |
| 5,568,272 A | | 10/1996 | Levine | 386/48 |
| 5,574,964 A | | 11/1996 | Hamlin | 455/3.1 |
| 5,579,308 A | | 11/1996 | Humpleman | 370/58.1 |
| 5,590,195 A | | 12/1996 | Ryan | |
| 5,600,364 A | | 2/1997 | Hendricks et al. | 725/9 |
| 5,600,573 A | | 2/1997 | Hendricks et al. | 725/109 |
| 5,600,707 A | | 2/1997 | Miller, II | 370/281 |
| 5,621,793 A | | 4/1997 | Bednarek et al. | 380/240 |
| 5,625,864 A | | 4/1997 | Budow et al. | |
| 5,636,247 A | | 6/1997 | Kamerman et al. | 375/260 |
| 5,638,423 A | | 6/1997 | Grube et al. | 455/411 |
| 5,642,384 A | | 6/1997 | Ramesh | 375/265 |
| 5,652,772 A | | 7/1997 | Isaksson et al. | 375/367 |
| 5,657,072 A | | 8/1997 | Aristides et al. | |
| 5,666,151 A | | 9/1997 | Kondo et al. | 725/147 |
| 5,682,206 A | | 10/1997 | Wehmeyer et al. | 348/563 |
| 5,699,105 A | | 12/1997 | Chen et al. | |
| 5,701,383 A | | 12/1997 | Russo et al. | |
| 5,708,961 A | | 1/1998 | Hylton et al. | |
| 5,714,945 A | | 2/1998 | Sakuma et al. | |
| 5,715,020 A | | 2/1998 | Kuroiwa et al. | 348/734 |
| 5,715,277 A | | 2/1998 | Goodson et al. | 375/222 |
| 5,732,359 A | | 3/1998 | Baranowsky et al. | 455/552.1 |
| 5,734,437 A | | 3/1998 | Back | |
| 5,751,806 A | | 5/1998 | Ryan | |
| 5,758,257 A | | 5/1998 | Herz et al. | 455/2 |
| 5,760,822 A | | 6/1998 | Coutinho | |
| 5,774,527 A | | 6/1998 | Handelman et al. | 379/93.07 |
| 5,778,181 A | | 7/1998 | Hidary et al. | |
| 5,787,472 A | | 7/1998 | Dan et al. | |
| 5,793,413 A | | 8/1998 | Hylton et al. | |
| 5,793,414 A | | 8/1998 | Shaffer | 725/133 |
| 5,796,442 A | | 8/1998 | Gove et al. | 348/556 |
| 5,801,787 A | | 9/1998 | Schein et al. | |
| 5,805,763 A | | 9/1998 | Lawler et al. | |
| 5,808,659 A | | 9/1998 | Coutinho et al. | |
| 5,809,204 A | | 9/1998 | Young et al. | 386/83 |
| 5,815,794 A | | 9/1998 | Williams | |
| 5,828,403 A | | 10/1998 | DeRodeff et al. | |
| 5,835,128 A | | 11/1998 | MacDonald et al. | 725/81 |
| 5,835,602 A | | 11/1998 | Lang | 380/268 |
| 5,838,873 A | | 11/1998 | Blatter et al. | 386/95 |
| 5,850,218 A | | 12/1998 | LaJoie et al. | |
| 5,850,340 A | | 12/1998 | York | 700/83 |
| 5,851,149 A | | 12/1998 | Xidos et al. | 463/42 |
| 5,867,485 A | | 2/1999 | Chambers et al. | 370/281 |
| 5,872,644 A | | 2/1999 | Yamazaki et al. | 398/63 |
| 5,883,677 A | | 3/1999 | Hofmann | 348/584 |
| 5,886,732 A | | 3/1999 | Humpleman | |
| 5,886,753 A | | 3/1999 | Shinyagaito et al. | |
| 5,915,068 A | | 6/1999 | Levine | 386/83 |
| 5,920,801 A | | 7/1999 | Thomas et al. | 725/82 |
| 5,930,247 A | | 7/1999 | Miller, II et al. | 370/338 |
| 5,936,660 A | | 8/1999 | Gurantz | 725/71 |
| 5,940,073 A | | 8/1999 | Klosterman et al. | 715/721 |
| 5,940,387 A | | 8/1999 | Humpleman | 370/352 |
| 5,970,053 A | | 10/1999 | Schick et al. | 370/252 |
| 5,970,386 A | | 10/1999 | Williams | 725/69 |
| 5,983,068 A | | 11/1999 | Tomich et al. | |
| 5,990,927 A | | 11/1999 | Hendricks et al. | 725/132 |
| 5,995,258 A | | 11/1999 | Weber et al. | 398/125 |
| 5,999,622 A | | 12/1999 | Yasukawa et al. | 705/51 |
| 6,005,861 A | | 12/1999 | Humpleman | 370/352 |
| 6,005,876 A | | 12/1999 | Cimini, Jr. et al. | 370/525 |
| 6,006,257 A | | 12/1999 | Slezak | |
| 6,014,546 A | | 1/2000 | Georges et al. | 725/79 |
| 6,018,768 A | | 1/2000 | Ullman et al. | |
| 6,023,603 A | | 2/2000 | Matsubara | 455/3.2 |
| 6,026,150 A | | 2/2000 | Frank | 379/90.01 |
| 6,037,998 A | | 3/2000 | Usui et al. | 348/569 |
| 6,052,556 A | | 4/2000 | Sampsell | |
| 6,055,355 A | | 4/2000 | Lee | |
| 6,061,449 A | | 5/2000 | Candelore et al. | 380/28 |
| 6,069,621 A | | 5/2000 | Schupak | 715/717 |
| 6,073,122 A | | 6/2000 | Wool | 705/51 |
| 6,091,320 A | | 7/2000 | Odinak | |
| 6,091,767 A | | 7/2000 | Westerman | 375/240 |
| 6,100,883 A | | 8/2000 | Hoarty | |
| 6,100,936 A | | 8/2000 | Jordan et al. | 348/552 |

(56) References Cited

U.S. PATENT DOCUMENTS

| | | | | |
|---|---|---|---|---|
| 6,115,456 | A | 9/2000 | Nolde | 379/102.01 |
| 6,118,873 | A | 9/2000 | Lotspiech et al. | 380/277 |
| 6,119,154 | A | 9/2000 | Weaver et al. | 709/219 |
| 6,122,482 | A | 9/2000 | Green, Sr. et al. | 455/3.2 |
| 6,125,103 | A | 9/2000 | Bauml et al. | 370/203 |
| 6,133,912 | A | 10/2000 | Montero | 715/716 |
| 6,151,493 | A | 11/2000 | Sasakura et al. | 455/421 |
| 6,166,744 | A | 12/2000 | Jaszlics et al. | |
| 6,169,543 | B1 | 1/2001 | Wehmeyer | 345/327 |
| 6,172,712 | B1 | 1/2001 | Beard | |
| 6,175,343 | B1 | 1/2001 | Mitchell et al. | |
| 6,175,551 | B1 | 1/2001 | Awater et al. | 370/210 |
| 6,177,931 | B1 | 1/2001 | Alexander et al. | |
| 6,177,963 | B1 | 1/2001 | Foye et al. | |
| 6,181,784 | B1 | 1/2001 | Duran et al. | |
| 6,182,287 | B1 | 1/2001 | Schneidewend et al. | 725/48 |
| 6,188,700 | B1 | 2/2001 | Kato et al. | 370/477 |
| 6,202,211 | B1 | 3/2001 | Williams, Jr. | |
| 6,208,669 | B1 | 3/2001 | Cimini, Jr. et al. | 370/525 |
| 6,215,526 | B1 | 4/2001 | Barton et al. | |
| 6,219,839 | B1 | 4/2001 | Sampsell | |
| 6,229,895 | B1 | 5/2001 | Son et al. | 380/200 |
| 6,230,162 | B1 | 5/2001 | Kumar et al. | 707/104.1 |
| 6,233,389 | B1 | 5/2001 | Barton et al. | |
| 6,236,653 | B1 | 5/2001 | Dalton et al. | |
| 6,285,746 | B1 | 9/2001 | Duran et al. | |
| 6,305,017 | B1 | 10/2001 | Satterfield | 725/44 |
| 6,310,886 | B1 | 10/2001 | Barton | |
| 6,314,146 | B1 | 11/2001 | Tellado et al. | 375/346 |
| 6,317,884 | B1 | 11/2001 | Eames et al. | |
| 6,324,338 | B1 | 11/2001 | Wood et al. | |
| 6,327,418 | B1 | 12/2001 | Barton | |
| 6,330,334 | B1 | 12/2001 | Ryan | |
| 6,333,937 | B1 | 12/2001 | Ryan | 370/468 |
| 6,353,929 | B1 | 3/2002 | Houston | 725/20 |
| 6,356,309 | B1 | 3/2002 | Masaki et al. | 348/439.1 |
| 6,377,552 | B1 | 4/2002 | Moran et al. | |
| 6,377,782 | B1 | 4/2002 | Bishop et al. | 455/3.01 |
| 6,378,130 | B1 | 4/2002 | Adams | 725/95 |
| 6,411,820 | B1 | 6/2002 | Margarit et al. | |
| 6,415,031 | B1 | 7/2002 | Colligan et al. | 380/200 |
| 6,418,558 | B1 | 7/2002 | Roberts et al. | 725/129 |
| 6,421,706 | B1 | 7/2002 | McNeill et al. | 709/204 |
| 6,424,947 | B1 | 7/2002 | Tsuria et al. | 705/1 |
| 6,438,165 | B2 | 8/2002 | Normile | 375/240 |
| 6,441,832 | B1 | 8/2002 | Tao et al. | |
| 6,442,755 | B1 | 8/2002 | Lemmons et al. | 725/47 |
| 6,452,923 | B1 | 9/2002 | Gerszberg et al. | |
| 6,459,427 | B1 | 10/2002 | Mao et al. | 725/109 |
| 6,473,559 | B1 | 10/2002 | Knudson et al. | |
| 6,481,013 | B1 | 11/2002 | Dinwiddie et al. | |
| 6,493,875 | B1 | 12/2002 | Eames et al. | |
| 6,496,980 | B1 | 12/2002 | Tillman et al. | 725/90 |
| 6,505,348 | B1 | 1/2003 | Knowles et al. | 725/49 |
| 6,516,029 | B1 | 2/2003 | Wang | |
| 6,526,581 | B1 | 2/2003 | Edson | |
| 6,530,085 | B1 | 3/2003 | Perlman | |
| 6,535,717 | B1 | 3/2003 | Matsushima et al. | 455/18 |
| 6,536,041 | B1 | 3/2003 | Knudson et al. | 725/39 |
| 6,542,610 | B2 | 4/2003 | Traw et al. | 380/262 |
| 6,556,557 | B1 | 4/2003 | Cimini, Jr. et al. | 370/342 |
| 6,567,981 | B1 | 5/2003 | Jeffrey | 725/80 |
| 6,578,070 | B1 | 6/2003 | Weaver et al. | 709/206 |
| 6,588,017 | B1 * | 7/2003 | Calderone | 725/120 |
| 6,594,798 | B1 | 7/2003 | Chou et al. | 714/820 |
| 6,614,936 | B1 | 9/2003 | Wu et al. | 382/238 |
| 6,622,304 | B1 | 9/2003 | Carhart | |
| 6,622,307 | B1 | 9/2003 | Ho | 725/120 |
| 6,631,522 | B1 | 10/2003 | Erdelyi | 725/53 |
| 6,637,031 | B1 | 10/2003 | Chou | 725/87 |
| 6,675,385 | B1 | 1/2004 | Wang | 725/39 |
| 6,681,326 | B2 | 1/2004 | Son et al. | 713/150 |
| 6,697,426 | B1 | 2/2004 | Van Der Schaar et al. | 375/240.01 |
| 6,697,489 | B1 | 2/2004 | Candelore | 380/200 |
| 6,704,028 | B2 | 3/2004 | Wugofski | 715/719 |
| 6,711,132 | B2 | 3/2004 | Lazarus | 370/236 |
| 6,735,221 | B1 | 5/2004 | Cherubini | |
| 6,735,312 | B1 | 5/2004 | Abdalla et al. | 380/239 |
| 6,754,905 | B2 | 6/2004 | Gordon et al. | |
| 6,756,997 | B1 | 6/2004 | Ward et al. | |
| 6,757,906 | B1 | 6/2004 | Look et al. | |
| 6,766,526 | B1 | 7/2004 | Ellis | 725/57 |
| 6,769,127 | B1 | 7/2004 | Bonomi et al. | 725/39 |
| 6,771,908 | B2 | 8/2004 | Eijk et al. | 398/66 |
| 6,785,258 | B1 | 8/2004 | Garcia, Jr. et al. | 370/344 |
| 6,785,901 | B1 | 8/2004 | Horowitz et al. | 725/25 |
| 6,788,740 | B1 | 9/2004 | van der Schaar et al. | 375/240 |
| 6,789,106 | B2 | 9/2004 | Eyer et al. | 709/205 |
| 6,791,995 | B1 | 9/2004 | Azenkot et al. | |
| 6,795,205 | B1 | 9/2004 | Gacek | 358/1.15 |
| 6,798,838 | B1 | 9/2004 | Ngo | 375/240.19 |
| 6,804,357 | B1 | 10/2004 | Ikonen et al. | 380/241 |
| 6,816,194 | B2 | 11/2004 | Zhang et al. | 375/240.27 |
| 6,816,904 | B1 | 11/2004 | Ludwig et al. | 709/226 |
| 6,845,486 | B2 | 1/2005 | Yamada et al. | |
| 6,864,778 | B2 | 3/2005 | Musschebroeck et al. | 340/3.41 |
| 6,868,292 | B2 | 3/2005 | Ficco et al. | 700/19 |
| 6,870,570 | B1 | 3/2005 | Bowser | |
| 6,889,385 | B1 | 5/2005 | Rakib et al. | 725/119 |
| 6,904,522 | B1 | 6/2005 | Benardeau et al. | 713/194 |
| 6,915,529 | B1 | 7/2005 | Suematsu et al. | 725/78 |
| 6,922,843 | B1 | 7/2005 | Herrington et al. | 725/30 |
| 6,930,788 | B1 | 8/2005 | Iwamoto et al. | 358/1.15 |
| 6,941,515 | B1 | 9/2005 | Wilkins | |
| 6,950,517 | B2 | 9/2005 | Hawkes et al. | 725/87 |
| 6,950,623 | B2 | 9/2005 | Brown et al. | |
| 6,954,897 | B1 | 10/2005 | Noguchi et al. | |
| 6,957,344 | B1 | 10/2005 | Goldshlag et al. | 713/194 |
| 6,970,539 | B2 | 11/2005 | Yamamoto et al. | 379/102.05 |
| 6,978,474 | B1 | 12/2005 | Sheppard et al. | 725/83 |
| 6,996,623 | B1 | 2/2006 | Kawano et al. | |
| 6,996,837 | B1 | 2/2006 | Miura et al. | 725/78 |
| 7,020,890 | B1 | 3/2006 | Suematsu et al. | 725/78 |
| 7,020,892 | B2 | 3/2006 | Levesque et al. | 725/89 |
| 7,039,169 | B2 | 5/2006 | Jones | 379/93.02 |
| 7,039,245 | B1 | 5/2006 | Hamery | |
| 7,042,526 | B1 | 5/2006 | Borseth | |
| 7,047,305 | B1 | 5/2006 | Brooks et al. | 709/231 |
| 7,054,289 | B1 | 5/2006 | Foster et al. | 370/330 |
| 7,065,781 | B1 | 6/2006 | Entwistle | 725/135 |
| 7,072,945 | B1 | 7/2006 | Nieminen et al. | 709/217 |
| 7,093,295 | B1 | 8/2006 | Saito | 726/80 |
| 7,114,174 | B1 | 9/2006 | Brooks et al. | 725/105 |
| 7,116,894 | B1 | 10/2006 | Chatterton | |
| 7,127,734 | B1 | 10/2006 | Amit | 725/80 |
| 7,130,576 | B1 | 10/2006 | Gurantz et al. | 455/3.02 |
| 7,139,398 | B2 | 11/2006 | Candelore et al. | 380/200 |
| 7,140,033 | B1 | 11/2006 | Durden et al. | 725/80 |
| 7,143,296 | B2 | 11/2006 | Hirata | |
| 7,146,628 | B1 | 12/2006 | Gordon et al. | 725/54 |
| 7,155,012 | B2 | 12/2006 | Candelore et al. | 380/42 |
| 7,184,550 | B2 | 2/2007 | Graunke | 380/42 |
| 7,185,095 | B2 | 2/2007 | Kawamoto et al. | |
| 7,185,355 | B1 | 2/2007 | Ellis et al. | 725/46 |
| 7,190,901 | B2 | 3/2007 | Farmer et al. | 398/67 |
| 7,194,558 | B2 | 3/2007 | Kawamoto et al. | |
| 7,209,667 | B2 | 4/2007 | Lindblad | 398/164 |
| 7,218,738 | B2 | 5/2007 | Pedlow et al. | 380/218 |
| 7,222,358 | B2 | 5/2007 | Levinson et al. | 725/121 |
| 7,231,516 | B1 | 6/2007 | Sparrell et al. | 713/156 |
| 7,233,669 | B2 | 6/2007 | Candelore | 380/210 |
| 7,234,155 | B1 | 6/2007 | Kay et al. | 725/60 |
| 7,260,829 | B1 | 8/2007 | Hendricks et al. | 725/152 |
| 7,278,154 | B2 | 10/2007 | Harrison et al. | |
| 7,305,700 | B2 | 12/2007 | Boynton et al. | 726/4 |
| 7,310,355 | B1 | 12/2007 | Krein et al. | 370/492 |
| 7,313,811 | B1 | 12/2007 | Sheppard et al. | |
| 7,336,787 | B2 | 2/2008 | Unger et al. | 380/217 |
| 7,346,120 | B2 | 3/2008 | McCorkle | 375/295 |
| 7,346,134 | B2 | 3/2008 | Smith | 375/346 |
| 7,350,225 | B2 | 3/2008 | Ovadia | |
| 7,360,233 | B2 | 4/2008 | Russ et al. | 725/118 |
| 7,360,235 | B2 | 4/2008 | Davies et al. | 725/133 |

(56) References Cited

U.S. PATENT DOCUMENTS

| | | | |
|---|---|---|---|
| 7,366,914 B2 | 4/2008 | Graunke | 713/190 |
| 7,386,874 B2 | 6/2008 | White et al. | |
| 7,392,389 B2 | 6/2008 | Kori | 713/170 |
| 7,434,246 B2 | 10/2008 | Florence | 725/46 |
| 7,487,532 B2 | 2/2009 | Robertson et al. | 725/111 |
| 7,489,924 B2 | 2/2009 | Choi | |
| 7,516,470 B2 | 4/2009 | Russ et al. | 725/48 |
| 7,545,935 B2 | 6/2009 | Claussen et al. | 380/200 |
| 7,574,723 B2 | 8/2009 | Putterman et al. | |
| 7,603,684 B1 | 10/2009 | Ellis | 725/39 |
| 7,673,314 B2 | 3/2010 | Ellis et al. | 725/46 |
| 7,698,723 B2 | 4/2010 | Hicks et al. | |
| 7,797,718 B2 | 9/2010 | Stecyk et al. | |
| 7,849,486 B2 | 12/2010 | Russ et al. | |
| 7,861,272 B2 | 12/2010 | Russ et al. | |
| 7,870,584 B2 | 1/2011 | Russ et al. | |
| 7,876,998 B2 | 1/2011 | Wall et al. | |
| 7,908,625 B2 | 3/2011 | Robertson et al. | |
| 8,010,976 B2 | 8/2011 | Karaoguz et al. | |
| 8,046,806 B2 | 10/2011 | Wall et al. | 725/78 |
| 8,094,640 B2 | 1/2012 | Robertson et al. | 370/343 |
| 8,127,326 B2 | 2/2012 | Claussen et al. | 725/25 |
| 8,230,470 B2 | 7/2012 | Robertson et al. | |
| 8,280,229 B2 | 10/2012 | Wall et al. | |
| 8,457,475 B2 | 6/2013 | Ellis et al. | |
| 8,549,567 B2 | 10/2013 | Russ et al. | |
| 8,627,385 B2 | 1/2014 | Davies et al. | |
| 2001/0005906 A1 | 6/2001 | Humpleman | |
| 2001/0011373 A1 | 8/2001 | Inoue | 725/50 |
| 2001/0017920 A1 | 8/2001 | Son et al. | 380/212 |
| 2001/0025378 A1 | 9/2001 | Sakamoto et al. | |
| 2001/0030664 A1 | 10/2001 | Shulman et al. | 345/835 |
| 2001/0039660 A1 | 11/2001 | Vasilevsky et al. | |
| 2002/0002707 A1 | 1/2002 | Ekel et al. | 725/87 |
| 2002/0007485 A1 | 1/2002 | Rodriguez et al. | 725/1 |
| 2002/0007493 A1 | 1/2002 | Butler et al. | |
| 2002/0010936 A1 | 1/2002 | Adam | 725/91 |
| 2002/0019984 A1 | 2/2002 | Rakib | 725/111 |
| 2002/0035726 A1 | 3/2002 | Corl | 725/39 |
| 2002/0035729 A1 | 3/2002 | Diep | 725/78 |
| 2002/0040475 A1 | 4/2002 | Yap et al. | 725/39 |
| 2002/0044762 A1 | 4/2002 | Wood et al. | |
| 2002/0051200 A1 | 5/2002 | Chang et al. | 358/1.15 |
| 2002/0051581 A1 | 5/2002 | Takeuchi et al. | 382/240 |
| 2002/0056112 A1 | 5/2002 | Dureau et al. | 725/78 |
| 2002/0059584 A1 | 5/2002 | Ferman et al. | |
| 2002/0059615 A1 | 5/2002 | Okawara et al. | 725/78 |
| 2002/0059617 A1 | 5/2002 | Terakado et al. | 725/80 |
| 2002/0059623 A1 | 5/2002 | Rodriguez et al. | 725/91 |
| 2002/0059637 A1 | 5/2002 | Rakib | 725/119 |
| 2002/0059642 A1 | 5/2002 | Russ et al. | 725/135 |
| 2002/0066101 A1 | 5/2002 | Gordon et al. | 725/43 |
| 2002/0067437 A1 | 6/2002 | Tsubouchi et al. | 348/725 |
| 2002/0069417 A1 | 6/2002 | Kliger et al. | |
| 2002/0083438 A1 | 6/2002 | So et al. | 725/31 |
| 2002/0087996 A1 | 7/2002 | Bi et al. | 725/89 |
| 2002/0090198 A1 | 7/2002 | Rosenberg et al. | 386/52 |
| 2002/0095673 A1 | 7/2002 | Leung et al. | 725/25 |
| 2002/0095689 A1 | 7/2002 | Novak | 725/151 |
| 2002/0100041 A1 | 7/2002 | Rosenbert et al. | 725/32 |
| 2002/0104001 A1 | 8/2002 | Lotspiech et al. | 713/163 |
| 2002/0108109 A1 | 8/2002 | Harris et al. | 725/32 |
| 2002/0108121 A1 | 8/2002 | Alao et al. | 725/110 |
| 2002/0116626 A1 | 8/2002 | Wood | 726/27 |
| 2002/0122045 A1 | 9/2002 | Woodson et al. | |
| 2002/0124249 A1 | 9/2002 | Shintani et al. | |
| 2002/0133558 A1 | 9/2002 | Fenno et al. | 709/208 |
| 2002/0137517 A1 | 9/2002 | Williams et al. | 455/444 |
| 2002/0138830 A1 | 9/2002 | Nagaoka et al. | |
| 2002/0141582 A1 | 10/2002 | Kocher et al. | 380/201 |
| 2002/0144262 A1 | 10/2002 | Plotnick et al. | 725/32 |
| 2002/0146237 A1 | 10/2002 | Safadi | |
| 2002/0154892 A1 | 10/2002 | Hoshen et al. | 386/87 |
| 2002/0157112 A1 | 10/2002 | Kuhn | 725/113 |
| 2002/0166124 A1 | 11/2002 | Gurantz et al. | |
| 2002/0174430 A1 | 11/2002 | Ellis et al. | |
| 2002/0174433 A1 | 11/2002 | Baumgartner et al. | |
| 2002/0174444 A1 | 11/2002 | Gatto et al. | 725/133 |
| 2002/0178445 A1 | 11/2002 | Eldering | 725/32 |
| 2002/0187779 A1 | 12/2002 | Freeny | 455/422.1 |
| 2002/0194596 A1 | 12/2002 | Srivastava | 725/37 |
| 2002/0196941 A1 | 12/2002 | Isaacson et al. | 380/231 |
| 2002/0198762 A1 | 12/2002 | Donato | 705/10 |
| 2002/0199188 A1 | 12/2002 | Sie et al. | |
| 2003/0005300 A1 | 1/2003 | Noble et al. | 713/172 |
| 2003/0005452 A1 | 1/2003 | Rodriguez | 725/86 |
| 2003/0009763 A1 | 1/2003 | Crinon et al. | 725/92 |
| 2003/0014750 A1 | 1/2003 | Kamen | 725/25 |
| 2003/0026423 A1 | 2/2003 | Unger et al. | 380/217 |
| 2003/0028886 A1 | 2/2003 | Wang et al. | 725/78 |
| 2003/0028890 A1 | 2/2003 | Swart et al. | 725/91 |
| 2003/0044165 A1 | 3/2003 | Wood et al. | 386/83 |
| 2003/0063003 A1 | 4/2003 | Bero et al. | 340/573.1 |
| 2003/0063814 A1 | 4/2003 | Herley | 382/255 |
| 2003/0069964 A1 | 4/2003 | Shteyn et al. | 709/225 |
| 2003/0074565 A1 | 4/2003 | Wasilewski et al. | 713/182 |
| 2003/0093812 A1 | 5/2003 | Chang et al. | 725/133 |
| 2003/0097563 A1 | 5/2003 | Moroney et al. | 713/170 |
| 2003/0097655 A1 | 5/2003 | Novak | |
| 2003/0097662 A1 | 5/2003 | Russ et al. | 725/132 |
| 2003/0108199 A1 | 6/2003 | Pinder et al. | 380/200 |
| 2003/0108336 A1 | 6/2003 | Schramel | 386/95 |
| 2003/0113100 A1* | 6/2003 | Hecht et al. | 386/83 |
| 2003/0123664 A1 | 7/2003 | Pedlow, Jr. et al. | |
| 2003/0135859 A1* | 7/2003 | Putterman et al. | 725/78 |
| 2003/0142664 A1 | 7/2003 | Gerszberg et al. | 370/354 |
| 2003/0145336 A1 | 7/2003 | Matsuzaki et al. | 725/136 |
| 2003/0149986 A1 | 8/2003 | Mayfield et al. | 725/63 |
| 2003/0149991 A1 | 8/2003 | Reidhead et al. | 725/119 |
| 2003/0154477 A1 | 8/2003 | Hassell et al. | |
| 2003/0159140 A1 | 8/2003 | Candelore | 725/31 |
| 2003/0159157 A1 | 8/2003 | Chan | 725/151 |
| 2003/0174048 A1 | 9/2003 | McCorkle | |
| 2003/0174837 A1 | 9/2003 | Candelore et al. | |
| 2003/0177495 A1 | 9/2003 | Needham et al. | |
| 2003/0181160 A1 | 9/2003 | Hirsch | 455/3.02 |
| 2003/0192047 A1 | 10/2003 | Gaul et al. | 725/39 |
| 2003/0192061 A1 | 10/2003 | Hwangbo et al. | 725/138 |
| 2003/0202772 A1 | 10/2003 | Dow et al. | 386/46 |
| 2003/0204856 A1 | 10/2003 | Buxton | 725/120 |
| 2003/0207672 A1 | 11/2003 | Dang et al. | 455/150.1 |
| 2003/0233667 A1 | 12/2003 | Umipig et al. | 725/152 |
| 2003/0235308 A1 | 12/2003 | Boynton et al. | 380/270 |
| 2003/0237093 A1 | 12/2003 | Marsh | 725/46 |
| 2004/0003393 A1 | 1/2004 | Gutta et al. | 725/25 |
| 2004/0003398 A1 | 1/2004 | Donian et al. | |
| 2004/0012717 A1 | 1/2004 | Sprague et al. | 348/564 |
| 2004/0017913 A1 | 1/2004 | Hawkes et al. | 380/37 |
| 2004/0025179 A1 | 2/2004 | Russ et al. | 725/46 |
| 2004/0028216 A1 | 2/2004 | Freyman | 379/406.01 |
| 2004/0032902 A1 | 2/2004 | Koifman et al. | 375/222 |
| 2004/0032950 A1 | 2/2004 | Graunke | 380/42 |
| 2004/0034874 A1 | 2/2004 | Hord et al. | 725/136 |
| 2004/0040035 A1 | 2/2004 | Carlucci et al. | 725/32 |
| 2004/0049793 A1 | 3/2004 | Chou | 725/87 |
| 2004/0051638 A1 | 3/2004 | Green | 340/539.32 |
| 2004/0054771 A1 | 3/2004 | Roe et al. | 709/224 |
| 2004/0060072 A1 | 3/2004 | Klein | 725/127 |
| 2004/0064714 A1 | 4/2004 | Carr | 713/193 |
| 2004/0068739 A1 | 4/2004 | Russ et al. | |
| 2004/0068744 A1 | 4/2004 | Claussen et al. | 725/81 |
| 2004/0068747 A1 | 4/2004 | Robertson et al. | 725/98 |
| 2004/0068752 A1 | 4/2004 | Parker | 725/120 |
| 2004/0068753 A1 | 4/2004 | Robertson et al. | 725/126 |
| 2004/0068754 A1 | 4/2004 | Russ | 725/131 |
| 2004/0078825 A1 | 4/2004 | Murphy | 725/109 |
| 2004/0090971 A1 | 5/2004 | Anderson | |
| 2004/0100897 A1 | 5/2004 | Shattil | 370/206 |
| 2004/0104926 A1 | 6/2004 | Murray et al. | |
| 2004/0107445 A1 | 6/2004 | Amit | 725/127 |
| 2004/0109497 A1 | 6/2004 | Koval | 375/222 |
| 2004/0111526 A1 | 6/2004 | Baldwin et al. | 709/231 |
| 2004/0117483 A1 | 6/2004 | Singer et al. | 709/225 |
| 2004/0117831 A1 | 6/2004 | Ellis et al. | 725/53 |

(56) References Cited

U.S. PATENT DOCUMENTS

| | | | |
|---|---|---|---|
| 2004/0128681 A1 | 7/2004 | Hancock et al. | 725/30 |
| 2004/0128682 A1 | 7/2004 | Liga | 725/35 |
| 2004/0133911 A1 | 7/2004 | Russ et al. | 725/69 |
| 2004/0163130 A1 | 8/2004 | Gray et al. | 725/132 |
| 2004/0172658 A1 | 9/2004 | Rakib et al. | 725/120 |
| 2004/0177369 A1 | 9/2004 | Akins, III | 725/31 |
| 2004/0177381 A1 | 9/2004 | Kliger et al. | 725/131 |
| 2004/0220791 A1 | 11/2004 | Lamkin et al. | |
| 2004/0221304 A1 | 11/2004 | Sparrell | 725/34 |
| 2004/0221308 A1 | 11/2004 | Cuttner et al. | |
| 2004/0250272 A1 | 12/2004 | Durden et al. | 725/25 |
| 2004/0250273 A1 | 12/2004 | Swix et al. | 725/25 |
| 2004/0255326 A1 | 12/2004 | Hicks et al. | 725/81 |
| 2004/0257976 A1 | 12/2004 | Alsobrook et al. | 370/206 |
| 2004/0261100 A1 | 12/2004 | Huber et al. | |
| 2004/0261126 A1 | 12/2004 | Addington et al. | 725/135 |
| 2005/0004873 A1 | 1/2005 | Pou et al. | 705/51 |
| 2005/0005287 A1 | 1/2005 | Claussen | 725/31 |
| 2005/0022248 A1 | 1/2005 | Roberson et al. | 725/118 |
| 2005/0028190 A1 | 2/2005 | Rodriguez et al. | 725/22 |
| 2005/0028208 A1 | 2/2005 | Ellis et al. | 725/58 |
| 2005/0030910 A1 | 2/2005 | Roberson et al. | 370/276 |
| 2005/0042999 A1 | 2/2005 | Rappaport | 455/307 |
| 2005/0044762 A1 | 3/2005 | Atluri | 40/600 |
| 2005/0050557 A1 | 3/2005 | Gabryjelski et al. | 720/600 |
| 2005/0063422 A1 | 3/2005 | Lazar et al. | 370/532 |
| 2005/0065780 A1 | 3/2005 | Wiser et al. | 704/201 |
| 2005/0073945 A1 | 4/2005 | Garcia, Jr. et al. | 370/206 |
| 2005/0076357 A1 | 4/2005 | Fenne | 725/14 |
| 2005/0155052 A1 | 7/2005 | Ostrowska et al. | 725/25 |
| 2005/0234992 A1 | 10/2005 | Haberman | 707/104.1 |
| 2005/0235323 A1 | 10/2005 | Ellis et al. | 725/58 |
| 2005/0251824 A1 | 11/2005 | Thomas et al. | |
| 2005/0251827 A1 | 11/2005 | Ellis et al. | 725/47 |
| 2005/0262542 A1 | 11/2005 | DeWeese et al. | 725/106 |
| 2006/0010481 A1 | 1/2006 | Wall et al. | 725/151 |
| 2006/0069645 A1 | 3/2006 | Chen et al. | 705/51 |
| 2006/0080360 A1 | 4/2006 | Young et al. | 707/104.1 |
| 2006/0095939 A1 | 5/2006 | Jutzi | 725/78 |
| 2006/0117354 A1 | 6/2006 | Schutte et al. | 725/78 |
| 2006/0150225 A1 | 7/2006 | Hegg et al. | 725/89 |
| 2006/0184967 A1 | 8/2006 | Maynard et al. | 725/46 |
| 2006/0218581 A1 | 9/2006 | Ostrowska et al. | 725/38 |
| 2006/0218591 A1 | 9/2006 | Billmaier et al. | 725/52 |
| 2006/0259584 A1 | 11/2006 | Watson et al. | 709/218 |
| 2007/0022307 A1 | 1/2007 | Ferrari | |
| 2007/0077038 A1 | 4/2007 | Wall | |
| 2007/0079341 A1 | 4/2007 | Russ et al. | 725/89 |
| 2007/0094698 A1 | 4/2007 | Bountour et al. | 725/132 |
| 2007/0143716 A1 | 6/2007 | Russ et al. | 725/74 |
| 2007/0300258 A1 | 12/2007 | O'Connor et al. | 725/44 |
| 2008/0066085 A1 | 3/2008 | Davies et al. | 719/321 |
| 2008/0072272 A1 | 3/2008 | Robertson et al. | |
| 2008/0148325 A1 | 6/2008 | Robertson et al. | 725/98 |
| 2008/0184327 A1 | 7/2008 | Ellis et al. | |
| 2008/0271094 A1 | 10/2008 | Kliger et al. | |
| 2008/0301738 A1 | 12/2008 | Davies et al. | 725/87 |
| 2009/0077586 A1 | 3/2009 | Wall et al. | 725/39 |
| 2009/0083819 A1 | 3/2009 | Robertson et al. | 725/118 |
| 2009/0150922 A1 | 6/2009 | Russ et al. | |
| 2009/0193452 A1 | 7/2009 | Russ et al. | |
| 2009/0249176 A1 | 10/2009 | Jarman | |
| 2010/0175093 A1 | 7/2010 | Arnold et al. | |
| 2010/0313238 A1* | 12/2010 | Baumgartner et al. | 725/153 |
| 2011/0035773 A1 | 2/2011 | Stecyk et al. | |
| 2011/0078745 A1 | 3/2011 | Macrae et al. | 725/60 |

FOREIGN PATENT DOCUMENTS

| | | |
|---|---|---|
| EP | 0 912 054 | 4/1999 |
| EP | 0 989 557 | 3/2000 |
| EP | 1 028 551 | 8/2000 |
| EP | 0 107 600 | 6/2001 |
| EP | 1 117 214 | 7/2001 |
| EP | 1 175 087 | 7/2001 |
| EP | 1145244 A1 | 10/2001 |
| EP | 0 822 718 B1 | 6/2002 |
| EP | 1 213 919 | 6/2002 |
| EP | 1 443 766 | 8/2004 |
| EP | 1 463 324 | 9/2004 |
| EP | 1543680 B1 | 2/2010 |
| WO | WO 95/25402 | 9/1995 |
| WO | WO 96/19079 | 6/1996 |
| WO | WO 98/26584 | 6/1998 |
| WO | 98/37648 | 8/1998 |
| WO | WO 99/01984 | 1/1999 |
| WO | WO 99/35842 | 7/1999 |
| WO | WO 99/35844 | 7/1999 |
| WO | WO 99/65244 | 12/1999 |
| WO | WO 00/04707 | 1/2000 |
| WO | WO 00/04709 | 1/2000 |
| WO | WO 00/07372 | 2/2000 |
| WO | WO 00/45590 | 3/2000 |
| WO | 00/35201 | 6/2000 |
| WO | WO 01/47234 | 6/2001 |
| WO | WO 01/56286 | 8/2001 |
| WO | WO 01/56297 | 8/2001 |
| WO | WO 01/74003 | 10/2001 |
| WO | WO 01/78382 | 10/2001 |
| WO | WO 01/86948 | 11/2001 |
| WO | WO 02/07378 | 1/2002 |
| WO | WO 02/11418 | 2/2002 |
| WO | WO 02/11446 | 2/2002 |
| WO | WO 02/17642 | 2/2002 |
| WO | WO 02/19623 | 3/2002 |
| WO | WO 02/47388 | 6/2002 |
| WO | WO 02/097997 | 12/2002 |
| WO | WO 03/032620 | 4/2003 |
| WO | WO 03/039154 | 5/2003 |
| WO | WO 01/01677 | 1/2004 |
| WO | WO 2004/023717 | 3/2004 |
| WO | WO 2004/032514 | 4/2004 |
| WO | WO 2004/036808 | 4/2004 |
| WO | WO 2004/036892 | 4/2004 |
| WO | WO 2004/064296 | 7/2004 |
| WO | WO 2004/098190 | 11/2004 |
| WO | WO 2005/034515 | 4/2005 |
| WO | WO 2006/093741 | 9/2006 |

OTHER PUBLICATIONS

SCTE, "Client-Based Digital Program Insertion Business Goal," DVS/632rl, Mar. 27, 2004.

SCTE, "Working Group Work Plan 5," DVS 177, Sep. 1, 1998.

SCTE, "Proposed Amendment of SCTE 30 2001 Digital Program Insertion Splicing API," DVS 638r3, Feb. 4, 2005.

Broadcast Engineering, "Digital Program Insertion," Business Models, Jul. 1, 2002.

nCUBE, "Digital Program Insertion," nCUBE, May 2001.

Matsushita Electric Industrial Co., Ltd. "DVB Call for Proposals for Content Protection & Copy Management Technologies," NetDRM Technology, XP002349078, Oct. 19, 2001, pp. 1-44.

International Search Report dated Mar. 1, 2005 in OCT/US2004/032389.

Canadian Office Action dated Jul. 24, 2009 in Application No. 2,566,742.

EP Summons to attend oral proceedings dated Jan. 27, 2010 in Application No. 03 774 942.1-1241.

U.S. Official Action mailed Mar. 13, 2006 in U.S. Appl. No. 10/008,581.

U.S. Official Action mailed Dec. 18, 2006 in U.S. Appl. No. 10/008,581.

U.S. Official Action mailed Mar. 21, 2007 in U.S. Appl. No. 10/294,947.

U.S. Official Action mailed Apr. 25, 2007 in U.S. Appl. No. 10/008,581.

U.S. Official Action mailed Jul. 10, 2007 in U.S. Appl. No. 10/104,921.

U.S. Official Action mailed Oct. 4, 2007 in U.S. Appl. No. 10/008,581.

(56) References Cited

OTHER PUBLICATIONS

U.S. Official Action mailed Oct. 5, 2007 in U.S. Appl. No. 10/294,947.
U.S. Official Action mailed Nov. 29, 2007 in U.S. Appl. No. 10/104,921.
U.S. Official Action mailed Jan. 10, 2008 in U.S. Appl. No. 10/923,948.
U.S. Official Action mailed Mar. 18, 2008 in U.S. Appl. No. 10/008,581.
U.S. Official Action mailed Apr. 24, 2008 in U.S. Appl. No. 10/104,921.
U.S. Official Action mailed May 1, 2008 in U.S. Appl. No. 10/923,948.
U.S. Official Action mailed May 15, 2008 in U.S. Appl. No. 10/294,947.
U.S. Official Action mailed Jun. 2, 2008 in U.S. Appl. No. 10/998,879.
U.S. Official Action mailed Jun. 30, 2008 in U.S. Appl. No. 10/907,540.
U.S. Official Action mailed Jul. 9, 2008 in U.S. Appl. No. 11/069,440.
U.S. Official Action mailed Sep. 18, 2008 in U.S. Appl. No. 10/008,581.
U.S. Official Action mailed Nov. 6, 2008 in U.S. Appl. No. 10/104,921.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Dec. 23, 2008 in U.S. Appl. No. 11/163,107.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed May 21, 2009 in U.S. Appl. No. 10/294,947.
U.S. Official Action mailed May 21, 2009 in U.S. Appl. No. 10/998,879.
U.S. Official Action mailed Jun. 10, 2009 in U.S. Appl. No. 10/907,540.
U.S. Official Action mailed Jun. 11, 2009 in U.S. Appl. No. 10/104,921.
U.S. Official Action mailed Aug. 19, 2009 in U.S. Appl. No. 11/069,440.
U.S. Official Action mailed Sep. 4, 2009 in U.S. Appl. No. 11/564,347.
U.S. Official Action mailed Nov. 16, 2009 in U.S. Appl. No. 10/907,540.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Jan. 12, 2010 in U.S. Appl. No. 10/104,921.
U.S Official Action mailed Jan. 21, 2010 in U.S. Appl. No. 11/069,439.
U.S. Official Action mailed Jan. 25, 2010 in U.S. Appl. No. 11/162,232.
U.S. Official Action mailed Jan. 28, 2010 in U.S. Appl. No. 10/924,077.
U.S. Appl. No. 09/332,244, filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344, filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161, filed Jul. 16, 1999 entitled "Interactive Television Program Guide System Having Multiple Devices Within a Household", Inventors: Michael Ellis, William Thomas, Thomas Lemmons.
Kerr, G., "A Review of Fully Interactive Video on Demand" Signal Processing Image Communication, Elsevier Science Publishers, Amsterdam, NL, vol, 8, No. 3, Apr. 1996, pp. 173-190, XP004047063 ISSN: 09235965.
Alexis De Lattre er al., Videolan Streaming (online) Feb. 12, 2005, pp. 1-14.
Microsoft Computer Dictionary, 1999, Microsoft Press, 4th Edition, p. 123.
Alexis De Lattre et al., Videolan Streaming How to, 2005, pp. 1-61.
SCTE, "POD Copy Protection System," SCTE Society of Cable Telecommunications Engineers, [Online] Dec. 31, 2004, pp. 1-68, XP002414048, http://www.scte.org/documents/pdf/ANSISCTE412004.pdf.
Delta Beta In-Flight, www.deltabeta.com, retrieved from the internet on Jul. 17, 2008.
Written Opinion mailed Nov. 7, 2005 in PCT Application No. PCT/US2005/016290.
International Search Report dated Oct. 31, 2005 in PCT Application No. PCT/US2005/016290.
EP Communication dated Jul. 12, 2007 in Application No. 05 748 223.4-1241.
International Preliminary Examination Report dated Dec. 21, 2005 in PCT/US2003/32527.
Written Opinion mailed Dec. 10, 2004 in PCT/US2003/32527.
International Search Report dated Nov. 10, 2004 in PCT/US2003/32527.
International Preliminary Examination Report dated Jan. 18, 2006 in PCT/US2003/33686.
Written Opinion mailed Jun. 3, 2005 in PCT/US2003/33686.
International Search Report dated Feb. 6, 2004 in PCT/US2003/33686.
Canadian Office Action dated May 30, 2008 in Application No. 2,520,505.
Canadian Office Action dated Sep. 4, 2008 in Application No. 2,501,865.
International Search Report dated Sep. 29, 2006 in PCT/US2006/006199.
Written Opinion dated Oct. 12, 2006 in PCT/US2006/006199.
International Search Report dated Jan. 10, 2007 in PCT/US2006/033967.
Written Opinion mailed Mar. 2, 2007 in PCT/US2006/033967.
EP Communication dated Oct. 14, 2009 in Application No. 03 777 604.4-1241.
Supplementary European Search Report dated Jun. 18, 2009 in Application No. 03 777 604.4.
EP Communication dated Jun. 27, 2009 in Application No. 03 774 942.1.
Supplementary European Search Report dated Feb. 6, 2009 in Application No. 03 774 942.1-1241.
U.S. Official Action mailed Dec. 5, 2003 in U.S. Appl. No. 10/235,201.
U.S. Official Action mailed Feb. 13, 2004 in U.S. Appl. No. 10/342,670.
U.S. Official Action mailed May 7, 2004 in U.S. Appl. No. 10/235,201.
U.S. Official Action mailed Jul. 24, 2004 in U.S. Appl. No. 10/342,670.
U.S. Official Action mailed Sep. 10, 2004 in U.S. Appl. No. 10/437,556.
U.S. Official Action mailed Mar. 21, 2005 in U.S. Appl. No. 10/212,017.
U.S. Official Action mailed Mar. 23, 2005 in U.S. Appl. No. 10/342,670.
U.S. Official Action mailed Jun. 15, 2005 in U.S. Appl. No. 10/437,556.

(56) References Cited

OTHER PUBLICATIONS

U.S. Official Action mailed Jul. 27, 2005 in U.S. Appl. No. 10/235,201.
U.S. Official Action mailed Aug. 11, 2005 in U.S. Appl. No. 10/342,670.
U.S. Official Action mailed Oct. 19, 2005 in U.S. Appl. No. 10/212,017.
U.S. Official Action mailed Jan. 11, 2006 in U.S. Appl. No. 10/235,201.
U.S. Official Action mailed Jan. 30, 2006 in U.S. Appl. No. 10/437,556.
U.S. Official Action mailed Feb. 8, 2006 in U.S. Appl. No. 10/342,670.
U.S. Official Action mailed Apr. 19, 2006 in U.S. Appl. No. 10/212,017.
U.S. Official Action mailed Jun. 28, 2006 in U.S. Appl. No. 10/342,670.
U.S. Official Action mailed Jun. 30, 2006 in U.S. Appl. No. 10/437,556.
U.S. Official Action mailed Jul. 31, 2006 in U.S. Appl. No. 10/235,201.
U.S. Official Action mailed Oct. 31, 2006 in U.S. Appl. No. 10/342,670.
U.S. Official Action mailed Nov. 17, 2006 in U.S. Appl. No. 10/235,201.
U.S. Official Action mailed Nov. 20, 2006 in U.S. Appl. No. 10/437,556.
U.S. Official Action mailed May 3, 2007 in U.S. Appl. No. 10/437,556.
U.S. Official Action mailed May 4, 2007 in U.S. Appl. No. 10/263,160.
U.S. Official Action mailed May 4, 2007 in U.S. Appl. No. 10/924,077.
U.S. Official Action mailed May 7, 2007 in U.S. Appl. No. 10/342,670.
U.S. Official Action mailed May 8, 2007, in U.S. Appl. No. 10/263,449.
U.S. Official Action mailed Jul. 10, 2007 in U.S. Appl. No. 10/263,270.
U.S. Official Action mailed Jul. 18, 2007 in U.S. Appl. No. 11/162,232.
U.S. Official Action mailed Sep. 4, 2007 U.S. Appl. No. 10/712,289.
U.S. Official Action mailed Sep. 10, 2007 in U.S. Appl. No. 10/842,823.
U.S. Official Action mailed Nov. 15, 2007 in U.S. Appl. No. 10/924,077.
U.S. Official Action mailed Nov. 16, 2007 in U.S. Appl. No. 10/263,160.
U.S. Official Action mailed Nov. 30, 2007 in U.S. Appl. No. 10/263,449.
U.S. Official Action mailed Jan. 4, 2008 in U.S. Appl. No. 10/342,670.
U.S. Official Action mailed Jan. 14, 2008 in U.S. Appl. No. 10/263,270.
U.S. Official Action mailed Jan. 29, 2008 in U.S. Appl. No. 11/162,232.
U.S. Official Action mailed Feb. 8, 2008 in U.S. Appl. No. 10/403,485.
U.S. Official Action mailed Mar. 18, 2008 in U.S. Appl. No. 10/924,077.
U.S. Official Action mailed Mar. 19, 2008 in U.S. Appl. No. 10/712,289.
U.S. Official Action mailed Apr. 4, 2008 in U.S. Appl. No. 10/842,823.
U.S. Official Action mailed May 13, 2008 in U.S. Appl. No. 10/263,160.
U.S. Official Action mailed Jun. 12, 2008 in U.S. Appl. No. 10/263,449.
U.S. Official Action mailed Jul. 8, 2008 in U.S. Appl. No. 11/069,439.
U.S. Official Action mailed Jul. 25, 2008 in U.S. Appl. No. 10/342,670.
U.S. Official Action mailed Sep. 5, 2008 in U.S. Appl. No. 11/162,232.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.
U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 26, 2008 in U.S. Appl. No. 11/069,439.
U.S. Official Action mailed Jan. 28, 2009 in U.S. Appl. No. 10/342,670.
U.S. Official Action mailed Feb. 6, 2009 in U.S. Appl. No. 10/263,270.
U.S. Official Action mailed Feb. 14, 2009 in U.S. Appl. No. 10/263,449.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Mar. 20, 2009 in U.S. Appl. No. 11/162,232.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed Jul. 29, 2009 in U.S. Appl. No. 10/924,077.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Jul. 6, 2011 in U.S. Appl. No. 12/178,731.
U.S. Official Action mailed Jul. 7, 2011 in U.S. Appl. No. 12/036,329.
Supplementary European Search Report dated Jul. 14, 2005 in Application No. 03 74 5552.
International Search Report dated Jun. 14, 2006 in PCT/US2006/006201.
International Search Report dated Sep. 28, 2006 in PCT/US2006/010764.
International Search Report dated Jan. 25, 2007 in PCT/US2006/037542 .
Written Opinion dated Jan. 25, 2007 in PCT/US2006/037542
International Search Report dated Oct. 29, 2007 in PCT/US2006/060967.
Written Opinion dated Oct. 29, 2007 in PCT/US2006/060967.
EP Communication dated Mar. 10, 2008 in Application No. 05 852 294.7.
International Search Report dated Jun. 9, 2008 in PCT/US2007/085694.
EP Communication dated Jul. 18, 2008 in Application No. 05 852 294.7.

(56) References Cited

OTHER PUBLICATIONS

EP Communication dated Feb. 27, 2009 in Application No. 06 739 511.1.
EP Communication dated Apr. 6, 2009 in Application No. 05 852 294.7-1522.
Canadian Office Action dated Apr. 15, 2009 in Application No. 2,478,838.
EP Communication dated Aug. 24, 2009 in Application No. 06 735 737.6-241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.
Canadian Office Action dated Dec. 15, 2009 in Application No. 2,520,505.
Canadian Office Action dated Jan. 13, 2010 in Application No. 2,541,161.
Canadian Office Action dated Mar. 4, 2010 in Application No. 2,599,941.
EP Communication dated Mar. 18, 2010 in Application No. 06 815 494.7.
EP Communication dated Apr. 12, 2010 in Application No. 03 777 604.4-1241.
Canadian Office Action dated Jul. 2, 2010 in Application No. 2,630,123.
U.S. Official Action mailed May 31, 2005 in U.S. Appl. No. 09/332,244.
U.S. Official Action mailed Sep. 20, 2006 in U.S. Appl. No. 10/036,329.
U.S. Official Action mailed Dec. 19, 2006 in U.S. Appl. No. 09/332,244.
U.S. Official Action mailed May 29, 2007 in U.S. Appl. No. 10/036,329.
U.S. Official Action mailed Jun. 27, 2007 in U.S. Appl. No. 09/332,244.
U.S. Official Action mailed Nov. 2, 2007 in U.S. Appl. No. 10/676,968.
U.S. Official Action mailed Jul. 23, 2008 in U.S. Appl. No. 10/676,968.
U.S. Official Action mailed Dec. 26, 2008 in U.S. Appl. No. 11/164,337.
U.S. Official Action mailed Apr. 6, 2009 in U.S. Appl. No. 11/945,284.
U.S. Official Action mailed Jul. 21, 2009 in U.S. Appl. No. 11/164,337.
U.S. Official Action mailed Oct. 6, 2009 in U.S. Appl. No. 12/352,140.
U.S. Official Action mailed Oct. 29, 2009 in U.S. Appl. No. 11/945,284.
U.S. Official Action mailed Nov. 30, 2009 in U.S. Appl. No. 10/998,879.
U.S. Official Action mailed Dec. 30, 2009 in U.S. Appl. No. 11/164,337.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
U.S. Official Action mailed May 5, 2010 in U.S. Appl. No. 10/998,879.
U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No. 11/564,347.
U.S. Official Action mailed Jul. 16, 2010 in U.S. Appl. No. 11/164,337.
U.S. Official Action mailed Jul. 27, 2010 in U.S. Appl. No. 10/924,077.
U.S. Official Action mailed Aug. 17, 2010 in U.S. Appl. No. 12/036,329.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Appl. No. 09/262,870, filed Mar. 4, 1999 entitled "Program Guide System with Video-On-Demand Browsing," Inventors: Michael D. Ellis.
U.S. Appl. No. 09/568,932, filed May 11, 2000 entitled "Electronic Content Guide Renders Content Resources Transparent", Inventors: Eugene Shteyn et al.
Ep Communication dated Jul. 14, 2011 in Application No. 06 815 494.7.
Canadian Office Action dated Aug. 30, 2011 in Application No. 2,603,257.
Canadian Office Action dated Oct. 6, 2011 in Application No. 2,624,876.
U.S. Office Action mailed Sep. 13, 2011 in U.S. Appl. No. 10/907,540.
Canadian Office Action dated Feb. 10, 2011 in Application 2,599,947.
EP Communication dated Mar. 23, 2011 in Application No. 03 777 604.4.
EP Communication dated Mar. 31, 2011 in Application No. 03 799 378.9.
Canadian Office Action dated Apr. 13, 2011 in Application No. 2,630,123.
Canadian Office Action dated Apr. 20, 2011 in Application No. 2,588,912.
Canadian Office Action dated Apr. 20, 2011 in Application No. 2,566,742.
U.S. Office Action mailed Mar. 25, 2011 in U.S. Appl. No. 10/907,540.
U.S. Official Action mailed Apr. 1, 2011 in U.S. Appl. No. 12/416,392.
U.S. Official Action mailed Apr. 27, 2011 in U.S. Appl. No. 11/945,284.
Proakis, "Section 4.3.3, Non-linear modulation methods with memory," Digital Communications, Jan. 1, 1995, McGraw Hill, Singapore, XP002613053, ISBN: 0-07-113814-5, pp. 190-199.
Canadian Office Action dated Sep. 1, 2010 in Application No. 2,494,494.
Canadian Office Action dated Oct. 14, 2010 in Application No. 2,501,112.
EP Summons to attend oral proceedings dated Dec. 13, 2010 in Application No. 06 815 494.7.
Supplementary European Search Report dated Dec. 20, 2010 in Application No. 03 799 378.9.
U.S. Official Action mailed Sep. 14, 2010 in U.S. Appl. No. 11/942,077.
U.S. Official Action mailed Oct. 15, 2010 in U.S. Appl. No. 10/907,540.
U.S. Official Action mailed Nov. 10, 2010 in U.S. Appl. No. 10/263,270.
U.S. Official Action mailed Nov. 23, 2010 in U.S. Appl. No. 10/263,449.

(56) References Cited

OTHER PUBLICATIONS

U.S. Notice of Allowance mailed Nov. 26, 2010 in U.S. Appl. No. 11/162,232.
EP Summons to attend oral proceedings dated Dec. 2, 2010 in Application No. 03 777 604.4.
Canadian Office Action dated Dec. 3, 2010 in Application No. 2,478,838.
Canadian Office Action dated Dec. 17, 2010 in Application No. 2,497,013.
Canadian Office Action dated Jan. 20, 2011 in Application No. 2,599,941.
Canadian Office Action dated Jan. 27, 2011 in Application No. 2,621,382.
U.S. Official Action mailed Feb. 2, 2011 in U.S. Appl. No. 12/178,731.
U.S. Official Action mailed Feb. 2, 2011 in U.S. Appl. No. 12/036,329.
U.S. Official Action mailed Feb. 15, 2011 in U.S. Appl. No. 10/403,485.
U.S. Official Action mailed Mar. 18, 2011 in U.S. Appl. No. 11/943,077.
EP Communication dated Mar. 16, 2012 in Application No. 06 739 511.1.
U.S. Official Action mailed May 9, 2012 in U.S. Appl. No. 12/416,392.
Canadian Office Action dated Nov. 23, 2011 in Application No. 2,520,505.
Canadian Office Action dated Nov. 24, 2011 in Application No. 2,254,161.
U.S. Official Action mailed Dec. 1, 2011 in U.S. Appl. No. 12/036,329.
U.S. Official Action mailed Feb. 21, 2012 in U.S. Appl. No. 12/273,886.
U.S. Official Action mailed Nov. 23, 2011 in U.S. Appl. No. 12/416,392.
Canadian Office Action dated Jan. 23, 2013 in Application No. 2,603,257.
U.S. Official Action mailed Jan. 16, 2013 in U.S. Appl. No. 12/178,731.
Canadian Office Action dated Apr. 10, 2012 in Application 2,599,941.
Canadian Office Action dated Apr. 13, 2012 in Application 2,621,382.
Canadian Office Action dated Apr. 13, 2012 in Application 2,629,313.
Canadian Office Action dated Apr. 17, 2012 in Application 2,599,947.
Canadian Office Action dated Apr. 2, 2013 in Application No. 2,520,505.
Canadian Office Action dated May 15, 2013 in Application No. 2,599,941.
EP Communications dated Jul. 17, 2013 in Application No. 05 748 223.4.
U.S. Official Action mailed Aug. 22, 2012 in U.S. Appl. No. 12/178,731.
Canadian Office Action dated Dec. 16, 2013 in Application No. 2,670,629.
Canadian Office Action dated Nov. 16, 2012 in Application 2,670,629.
Canadian Office Action dated Dec. 6, 2012 in Application No. 2,624,876.
U.S. Office Action mailed Nov. 29, 2012 in U.S. Appl. No. 10/907,540.
U.S. Office Action mailed Dec. 27, 2012 in U.S. Appl. No. 11/943,077.
Topfield; "The User's Manual Personal Video Recorder TF 4000 PVR"; Dec. 4, 2001, XP55033418, [retrieved on Jul. 20, 2012], 59 pgs.
Canadian Office Action dated Jun. 4, 2012 in Application 2,478,838.
EP Communication dated Jul. 19, 2012 in Application No. 01 990 098.4.
EP Communication dated Jul. 19, 2012 in Application No. 06 851 324.1.
EP Summons to attend oral proceedings dated Jul. 30, 2012 in Application No. 03799378.9.
EP Summons to attend oral proceedings dated Jul. 30, 2012 in Application No. 03799377.1.
U.S. Office Action mailed Jun. 26, 2012 in U.S. Appl. No. 10/907,540.
U.S. Office Action mailed Aug. 10, 2012 in U.S. Appl. No. 11/943,077.
U.S. Official Action mailed Sep. 26, 2014 in U.S. Appl. No. 12/178,731, 21 pgs.
Canadian Office Action dated Nov. 25, 2015 in Application No. 2,670,629, 4 pgs.

\* cited by examiner

HOME COMMUNICATION SYSTEMS

CROSS-REFERENCE TO RELATED PATENT APPLICATIONS

This application is a continuation of U.S. utility application entitled, "Systems and Methods for Operating a Peripheral Record/Playback Device in a Networked Multimedia System," having Ser. No. 10/437,556, filed May 14, 2003 now U.S. Pat. No. 7,360,235 and herein incorporated by reference, which claims priority to U.S. provisional application Ser. No. 60/418,402 filed on Oct. 15, 2002 and which is a continuation-in-part of U.S. patent application Ser. No. 10/342,670 filed Jan. 15, 2003 now U.S. Pat. No. 7,908,625, which claims priority to U.S. provisional application Ser. No. 60/416,155 filed Oct. 4, 2002, and which is a continuation-in-part of U.S. patent application Ser. No. 10/403,485 filed Mar. 31, 2003, which claims priority to U.S. provisional application Ser. No. 60/416,155 filed Oct. 4, 2002. Furthermore, the present application incorporates by reference in its entirety herein U.S. patent applications having Ser. Nos. 10/263,160; 10/263,449; and Ser. No. 10/263,270, which were filed on Oct. 2, 2002 and are assigned to a common assignee, the disclosures and teachings of which are hereby incorporated by reference.

FIELD OF THE INVENTION

This invention relates in general to broadband communications systems, and more particularly, to the field and functionality of a networked multimedia system having a plurality of receiving terminals and a networked peripheral device that is suitable for use in the broadband communications system.

DESCRIPTION OF THE RELATED ART

Broadband communications systems, such as satellite and cable television systems, are now capable of providing many services in addition to analog broadcast video. In implementing enhanced programming, the set-top terminal (STT), otherwise known as the set-top box, has become an important computing device for accessing various video services. In addition to supporting traditional analog broadcast video functionality, many STTs now also provide other functionality, such as, for example, an interactive program guide (IPG), video-on-demand (VOD), subscription video-on-demand (SVOD) and functionality traditionally associated with a conventional computer, such as e-mail. Recently new functionality has been added to conventional STTs—namely the ability to record an incoming video stream in digitized form onto a mass storage device, such as a hard disk drive, and play back that recorded video as desired by the user. This functionality has become known as a digital video recorder (DVR) or personal video recorder (PVR) and is viewed as a superior alternative to conventional video tape recorders for capture and subsequent playback of programming content.

An STT is typically connected to a communications network (e.g., a cable or satellite television network) and includes hardware and software necessary to provide various services and functionality. Preferably, some of the software executed by an STT is downloaded and/or updated via the communications network. Each STT also typically includes a processor, communication components, and memory, and is connected to a television or other display device. While many conventional STTs are stand-alone devices that are externally connected to a television, an STT and/or its functionality may be integrated into a television or other device, as will be appreciated by those of ordinary skill in the art.

An STT is typically connected to a television set and located at the home of the cable or satellite system subscriber. Since the STT is located at a subscriber's premises, it typically may be used by two or more users (e.g., household members). Television has become so prevalent in the United States, however, that the typical household may have two or more television sets, each television set requiring its own STT player if the subscriber wishes to have access to enhanced functionality. Additionally, each television set requires its own video cassette recorder (VCR) or digital video disc (DVD) player. However, the STTs and other peripheral devices can be expensive and users may not be willing to purchase additional devices. This is particularly true of STTs incorporating PVR functionality since such devices require not only the addition of a hard disk drive but also additional processing components and software.

Therefore, there exists a need for systems and methods for addressing these and/or other problems associated with STTs and peripheral devices. Specifically, there exists a need for systems and methods that allow multiple users operating discrete STTs within a networked premises or other local area to operate a central unit such as a VCR, DVD player, or other device having recording and playback functions.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Figure 1:
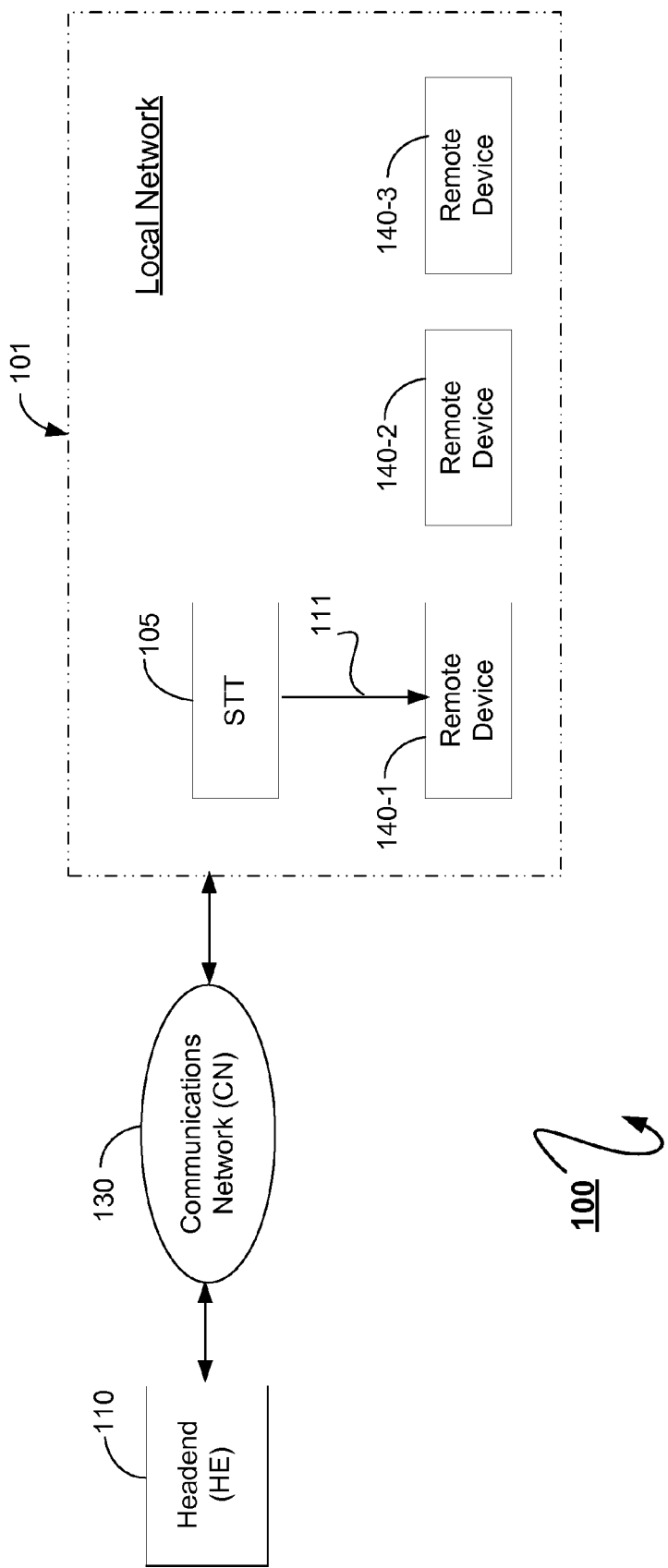
FIG. 1 is a simplified block diagram depicting a non-limiting example of a conventional broadband communications system.

Preferred embodiments of the invention can be understood in the context of a broadband communications system and a local network system. Note, however, that the invention may be embodied in many different forms and should not be construed as limited to the embodiments set forth herein. For example, transmitted broadband signals may include at least one of video/audio, telephony, data, and Internet Protocol (IP) signals, to name but a few. Additionally, receiving devices (i.e., a primary device and a plurality of remote devices) included in a local network system receiving the transmitted broadband signals may include a set-top terminal (STT), a television, a computer, a personal digital assistant (PDA), or other device. Furthermore, a networked peripheral device is explained in the context of a VCR or DVD player, but it is envisioned that the peripheral device can be an advanced record/playback device, such as a digital camcorder or an MP3 player. All examples given herein, therefore, are intended to be non-limiting and are provided in order to help clarify the description of the invention.

The present invention is directed towards a networked multimedia system including a networked peripheral device, such as a record/playback device, that can be shared among a plurality of receiving devices. Briefly, the peripheral device is preferably connected to the primary device and, advantageously, operated from any receiving device in the network. It will be appreciated, however, that the peripheral device can also be connected to any of the remote devices and shared among all receiving devices in the network. Accordingly, a user only needs to purchase one main peripheral device that can be operated from each receiving device in the network as if the peripheral device is collocated with each receiving device.

A networked multimedia system (NMS) is described in copending U.S. patent application Ser. No. 10/342,670, filed Jan. 15, 2003, the disclosure and teachings of which are hereby incorporated by reference. As taught therein, the NMS is typically located within a subscriber's premises. It will be appreciated, however, that the NMS can also be used in a multi-unit dwelling, business, school, hotel, or hospital, among others. Advantageously, the NMS allows a plurality of receiving devices in the premises to be locally networked (i.e., home-networked). One of the receiving devices typically acts as the server or primary device (i.e., the primary set-top terminal (STT)). The primary STT receives and forwards upon request broadband multimedia presentations (e.g., analog or digital television channels (i.e., audio/video signals), IP signals, video-on-demand (VOD) signals, administrative signals, etc.) throughout the local network to the plurality of remote devices (i.e., client devices). Furthermore, the remote devices may each request of and seamlessly receive from the primary STT resident presentations (e.g., a stored or recorded presentation, or the interactive program guide) and/or request access to a peripheral device (e.g., a VCR or DVD player) that may be connected to the primary STT or, alternatively, to any one of the remote devices, for example. Additionally, the remote devices may independently receive presentations from and send upstream signals to the communications network. Accordingly, the remote devices may be simplified, less-costly versions of the primary STT but are capable of utilizing, via the NMS, some or all of the advanced hardware and software features, such as memory, a mass storage device, software applications, or infrastructure for transmitting signals to coupled devices and the headend, that are available in the primary STT.

An Example of a Broadband Communications System

FIG. 1 is a simplified block diagram depicting a non-limiting example of a conventional broadband communications system 100. In this example, the communications system 100 includes a headend 110 that is coupled to a local network (LN) 101 via a communications network (CN) 130. The CN 130 may be any network that is suitable for carrying, preferably downstream and upstream, broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The headend 110 may include one or more server devices (not shown) for providing broadband signals, such as video, audio, and/or data signals, to the STT 105 via the CN 130. The headend 110 and the STT 105 cooperate to provide a user with a variety of services. The services may include, for example, analog or digital broadcast television services and channels, video-on-demand (VOD) services, and/or pay-per-view (PPV) services, among others. Each broadcast television channel typically provides a sequence of television presentations corresponding to a television station (e.g., ABC, NBC, CBS, or FNN, to name a few) and is typically identified by a channel number (e.g., channel 2, channel 3, channel 4, etc.) that is available to a user at all times. Additionally, PPV services are typically transmitted to the STT 105 at all times, but can only be viewed on the STT 105 as provisioned. On the other hand, the STT 105 typically requests a VOD service and, in response, the headend 110 transmits the presentation downstream to the STT 105.

The LN 101 includes a set-top terminal (STT) 105 that provides the broadband signals to remote devices 140-1 and 140-2, and, optionally, to additional remote devices including, for example, remote device 140-3. The STT 105 may be coupled to the remote devices either directly or via one or more other devices. It will be appreciated that the STT 105 may be a stand-alone unit or may be integrated into another device, such as, for example, a television or a computer. Additionally, the remote devices may be located in different rooms than where the STT 105 is located. Further information regarding the LN 101 is provided in copending U.S. patent application Ser. Nos. 10/263,160; 10/263,270; and 10/263,449, which were filed on Oct. 2, 2002, the disclosure and teachings of which are hereby incorporated in their entirety by reference.

Figure 2:
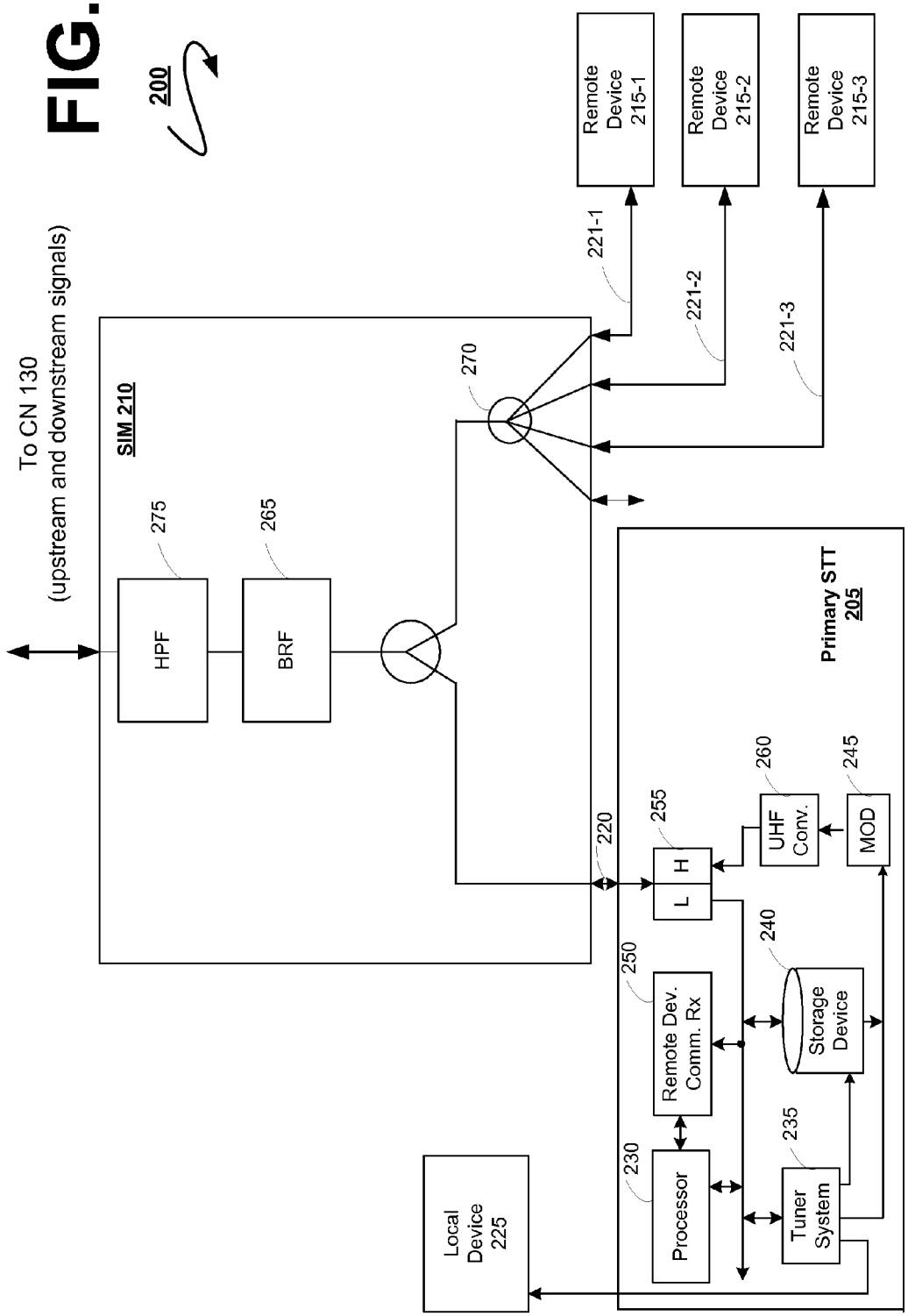
FIG. 2 is a block diagram illustrating one preferred embodiment of a networked multimedia system (NMS) that is suitable for use in the broadband communications system of FIG. 1.

A Preferred Embodiment of the Networked Multimedia System (NMS) Including a Networked Peripheral Device FIG. 2 is a block diagram illustrating one preferred embodiment of the NMS 200 that is suitable for use in the broadband communications system of FIG. 1. The NMS 200 includes a primary STT 205, a splitter/isolator module (SIM) 210, and a plurality of remote devices 215-$n$. Briefly, the SIM 210 receives downstream broadband signals from, for example, a headend or satellite and subsequently provides the downstream signals to the primary STT 205 or to both the primary STT 205 and any one or all of the plurality of remote devices 215-$n$ depending on the implementation. Upon command from at least one of the remote devices 215-$n$, the primary STT 205 may also forward selected real-time downstream signals and/or stored content signals to the requesting remote device(s) 215-$n$ via the SIM 210. More specifically, the plurality of remote devices 215-$n$ communicates with the primary STT 205 by sending reverse control/command signals via coaxial cable 220, 221-$n$ requesting, for example, stored presentations, real-time signals, or an interactive guide. It will be appreciated that other wired mediums, such as telephone lines or data cables, may be used so long as the transport format accommodates the desired transmission medium. Advantageously, in accordance with the present invention, the plurality of remote devices 215-*n* have access to all of the primary STT's hardware and software functionality, along with receiving downstream signals directly from the headend via the SIM 210. In this manner, the remote devices 215-*n* may have limited resources, such as not including a storage device or a connected record/playback device, thereby decreasing the overall costs to the service provider and the subscriber while offering advanced services to all of the remote devices that are networked to the primary STT 205.

FIG. 2 also illustrates a simplified, non-limiting block diagram of selected components of the primary STT 205 in accordance with one preferred embodiment of the present invention. In other embodiments, a primary STT 205 may include only some of the components shown in FIG. 2, in addition to other components that are not shown. Importantly, however, the primary STT 205 includes a processor 230, a tuner system 235, a storage device 240, a modulator 245, and a remote device communications receiver 250. In operation, downstream signals (i.e., signals typically ranging from 45 MHz to 850 MHz) are transmitted via the SIM 210 to a low pass filter in diplex filter 255, which provides the downstream signals to the tuner system 235. A plurality of tuners (not shown) included in the tuner system 235 are used to tune to frequency ranges that include content signals indicative of presentations, such as an analog or digital television channel, a PPV event, a VOD presentation, etc. For example, a VOD presentation may, in response to a user request, be received from the headend in the frequency range around 755 MHz, which corresponds to a particular television channel, such as channel 210. The user, therefore, selects the television channel 210 and, in response, a tuner in the tuner system 235 tunes to the frequency range around 755 MHz and extracts the received VOD presentation's content signals. Depending upon the implementation, the tuned VOD presentation is then provided to a viewing display 225 for viewing, the storage device 240 for storing, and/or the modulator 245 for modulating and subsequent transmission to the plurality of remote devices 215-*n*. Additionally, the user may wish to record the presentation using a peripheral device, such as a VCR.

In the event that a remote device 215-*n*, upon user input, requests a presentation from the primary STT 205, a reverse command signal is transmitted from the remote device 215-*n* to the primary STT 205 via the SIM 210. The remote device command receiver 250 receives and demodulates the command signal according to its transmission method, such as frequency-shift keying (FSK) or on-off keying (OOK) transmission. The processor 230 subsequently receives the demodulated command signals indicative of the requested action (e.g., requesting a presentation) and in accordance therewith instructs the tuner 235 to tune to, for example, a channel carrying a real-time downstream signal, or the processor may retrieve a stored presentation from the storage device 240. The presentation's content signals are then provided to the modulator 245, which modulates the selected presentation prior to forwarding to the SIM 210. A preferred embodiment of the present invention uses a quadrature amplitude modulation (QAM) modulator, which may be used for effectively transmitting signals over coaxial cable in a cable television environment. Other embodiments may include a quadrature phase-shift keying (QPSK) modulator in a satellite environment, an 8VSB (8-vestigial sideband) modulator in a digital terrestrial environment in the U.S., and a COFDM (coded orthogonal frequency division multiplexing) modulator in a digital terrestrial environment in Europe, or alternatively an analog modulator.

The modulated presentation is up-converted to a predetermined higher frequency, which is preferably greater than the highest frequency used in the communications network 130 (FIG. 1), with, for example, a UHF converter 260. In other words, the selected presentation is up-converted to a high frequency channel, such as channel 134, which may have a frequency range from 852 MHz to 858 MHz. It will be appreciated that other frequency ranges can be used, however, so long as the predetermined frequency is within the range that is tunable by the plurality of remote devices 215-*n*. In this example, the service provider would provide downstream signals in the range from 45 MHz to approximately 840 MHz. Accordingly, the up-converted signals at around 855 MHz would not interfere with the downstream signals that are concurrently provided via the common coax 220, 221-*n* to the primary STT 205 and the remote devices 215-*n*. The up-converted presentation is subsequently provided to the SIM 210 via a high pass filter in the diplex filter 255.

Furthermore, FIG. 2 illustrates a block diagram of a SIM 210 that comprises passive splitter/isolation components in accordance with the present invention. More specifically, a band reject filter (BRF) 265 rejects the frequencies (e.g., from 852 MHz to 858 MHz) of the selected NMS presentation, thereby not allowing the presentation to leave the NMS 200 and enter the communications network 130. It will be appreciated, therefore, that the NMS presentation is reflected off the BRF 265 and routed to a splitter 270 for transmission to the plurality of remote devices 215-*n*. A high pass filter (HPF) 275 is included to ensure that the reverse command signals provided by the plurality of remote devices 215-*n* are reflected and routed to the primary STT 205 and similarly not transmitted to the communications network 130. It will be appreciated that, if there are significant internal power losses, an amplifier (not shown) can also be included to amplify the downstream signals as necessary.

Figure 3:
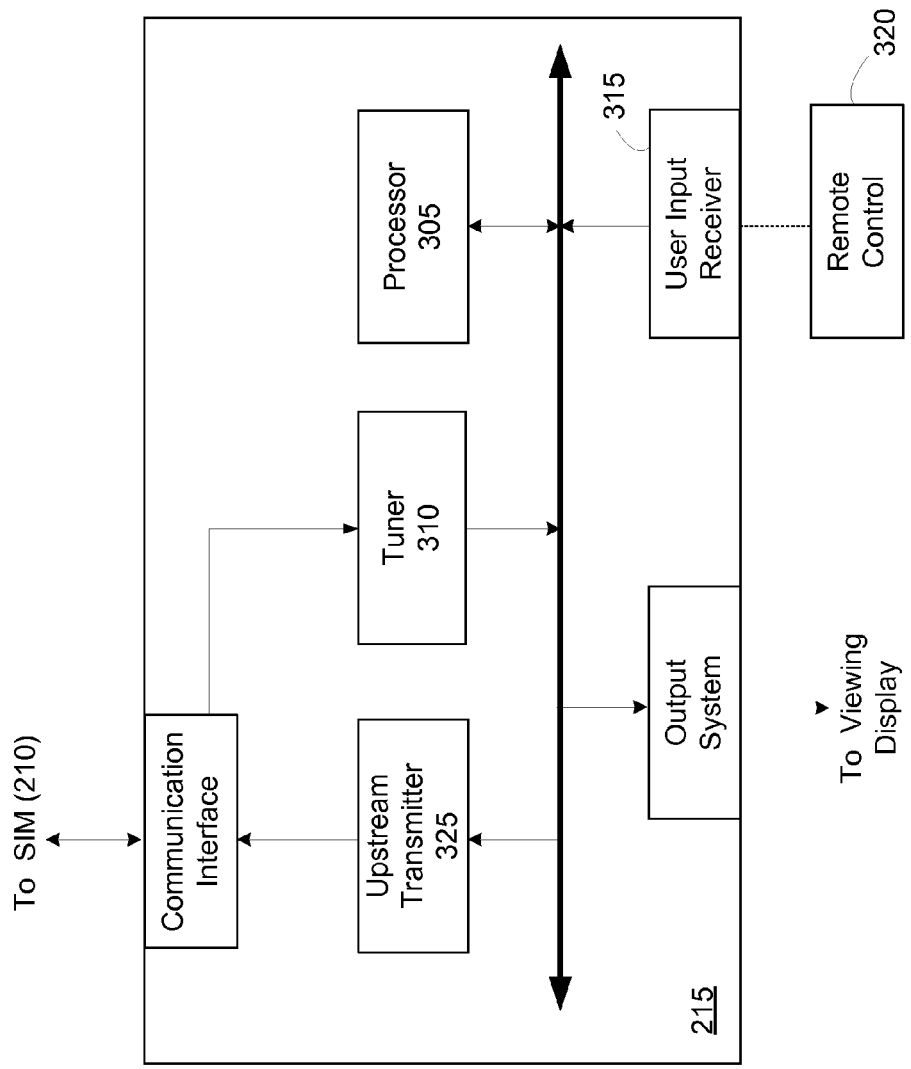
FIG. 3 is a simplified diagram of one preferred embodiment of a remote set-top terminal (STT) device that is suitable for use in the NMS of FIG. 2.

FIG. 3 is a simplified diagram of one preferred embodiment of a remote STT device 215-*n* that is suitable for use in the NMS of FIG. 2. It will be appreciated that the remote device 215-*n* may be identical to the primary STT 205 and just share the storage device contents and connected peripherals of the primary STT 205. Alternatively, the remote devices 215-*n* may be a simplified or conventional version of the primary STT 205. A processor 305 and a tuner system 310, which may be a simplified processor and only one tuner, may be included to extract channels from the received downstream broadband signals. Additionally, decryptors and decoders (not shown) may be included to decode encoded signals for proper processing and display. The remote devices 215-*n* may also include a user input receiver 315, such as an IR receiver or an RF receiver, that receives signals from a remote control 320, such as an IR remote control or an RF remote control, but is not required.

The reverse command signals, which typically originate from user input commands (e.g., tuned channels, NMS functions such as access to peripheral devices, IPG display, etc.), are transmitted via the coaxial cable 221-*n* that are routed between the remote devices 215-*n* and the SIM 210. It will be appreciated that though the coaxial cables 221-*n* are shown as separate cables, a common coaxial cable can be used tying the remote devices 215-*n* together so long as the processor 305 of each networked remote device 215-*n* is configured to understand and reject other remote device's reverse command signals. A preferred embodiment of the present invention processes and transmits the reverse command signals that are indicative of user input commands using frequency shift keying (FSK) and utilizes existing components that are typically included in a conventional remote set-top terminal. More specifically, a QPSK modulator (not shown) is typically included in the upstream transmitter 325 for modulating conventional upstream signals, which are signals typically ranging from 5 MHz to 40 MHz, for transmission to the headend and, in accordance with the present invention, for modulating the reverse command signals, which are signals typically at a frequency around 2.5 MHz, that are routed throughout the NMS 200. Accordingly, the QPSK modulator has an adjustable tuning frequency that modulates the reverse command signals and the upstream signals to a different frequency. In this manner, the reverse command signals do not interfere with conventionally transmitted upstream signals that may be provided by the remote devices 215-$n$. According to the preferred embodiment, the remote device command receiver 250 includes an FSK demodulator for demodulation. It will be appreciated, however, that the reverse command signals may alternatively be transmitted using, for example, on-off keying (OOK) or any other serial data transmissions, and the command receiver 250 can include any demodulator that is in accordance with the reverse command signal transmission used. After demodulation, the command receiver 250 sends signals indicative of the reverse command signal, such as, for example, requesting a recorded programs list, to the processor 230 for processing accordingly.

Figure 4:
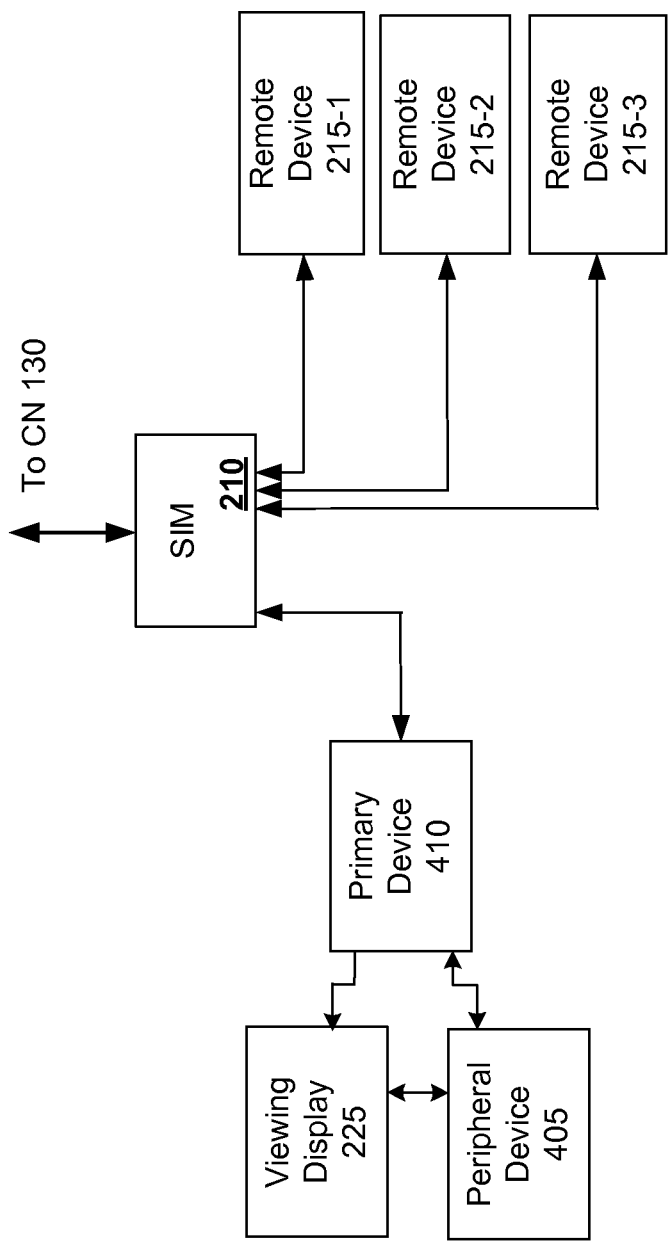
FIG. 4 depicts a networked system, such as shown in FIG. 2, including a networked peripheral device that can be operated from any of the receiving devices.

FIG. 4 depicts a networked system 400 including a networked peripheral device 405 that can be operated from any of the receiving devices 410, 215-$n$ in accordance with the present invention. Preferably, along with the primary device 410, the remote devices 215-$n$ access and operate the peripheral device's functionality and subsequently receive the media presentation from the peripheral device via the primary device 410 and the network 400. More specifically, upon user input, the remote devices 215-$n$ send reverse command signals indicative of control operations, such as selecting a disc that may be included in a high disc capacity DVD player and play, pause, stop, fast-forward, and rewind commands that may operate the peripheral device 405. Additionally, a user may send reverse command signals requesting the peripheral device 405 to record a selected downstream signal that is received at the primary device 410. Alternatively, a user may manually turn on and play the media presentation signals in the peripheral device 405. The primary device 410 can then broadcast the media presentation signals to the plurality of remote devices 215-$n$. Each remote device 215-$n$ simply tunes to the modulated channel and begins receiving and presenting the media presentation signals to a connected viewing display (not shown). Notably, however, except for the physical act of inserting a media presentation, such as a cassette or a disc, into the peripheral device 405, all other commands can be performed by each of the remote devices 215-$n$. In other words, the remote devices 215-$n$ operate the peripheral device 405 as if it were directly connected to each remote device 215-$n$. Furthermore, the remote devices 215-$n$ that are not communicating with or receiving signals from the peripheral device 405 can concurrently receive content signals from the communications network 130 or modulated signals from the primary device 410.

Figure 5:
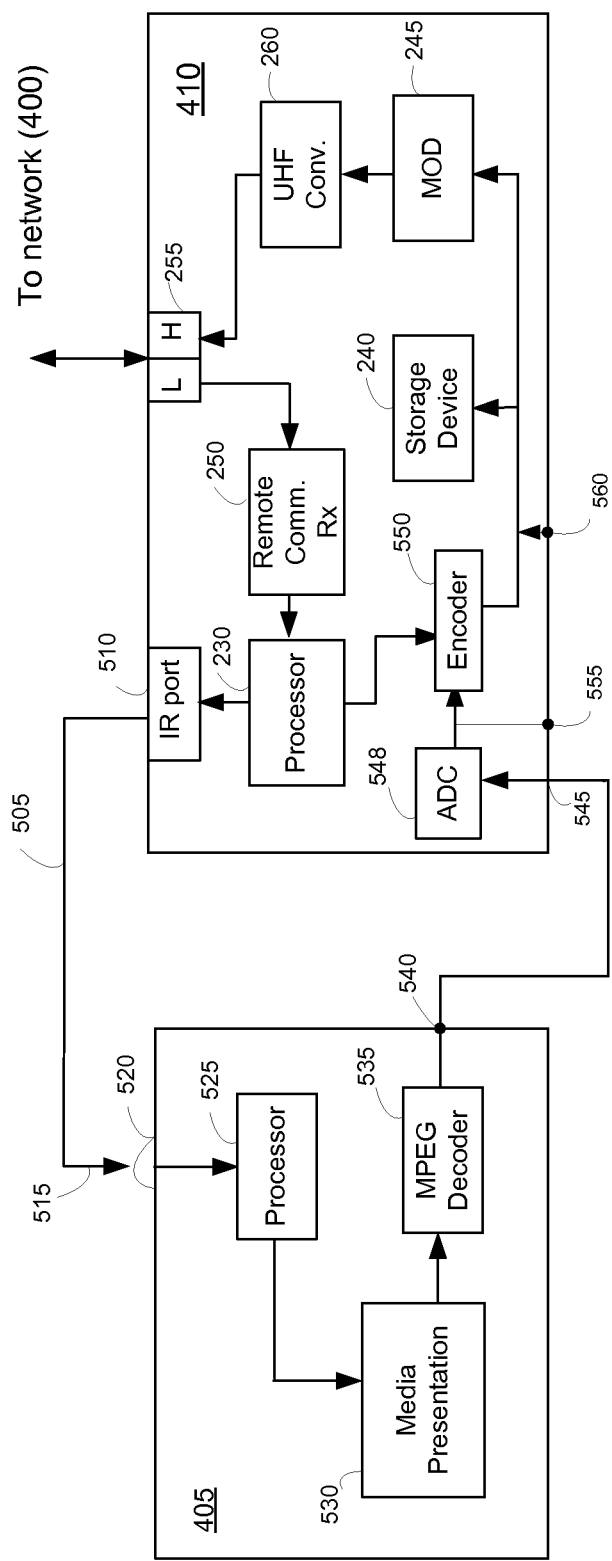
FIG. 5 illustrates a block diagram of the interaction between the primary STT and the peripheral device of FIG. 4.

FIG. 5 illustrates a block diagram of the interaction between the primary device 410 and the peripheral device 405. It will be appreciated that the peripheral device cables, such as power cables, audio/video cables, etc., may be connected to the primary device 410 and the viewing display 225 in a known manner. In the preferred embodiment, an infrared (IR) cable 505 is connected via an IR connector to an IR port 510 on the primary device 410. On the opposite end of the cable 505, an IR emitter 515 is located in close proximity to an IR sensor 520, which is located on the outside of the peripheral device 405. It will be appreciated that the IR sensor 520 is typically included on any consumer electronics device that can be operated by a remote control. Accordingly, IR signals that are indicative of control functions (e.g., play, pause, fast-forward, rewind, record, etc.) are transmitted from the primary device 410 to the peripheral device 405.

Figure 6:
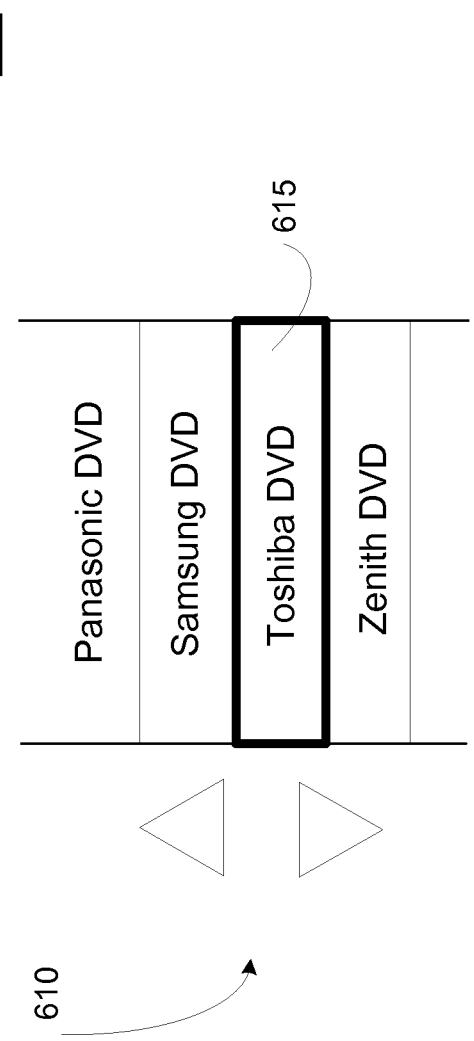
FIG. 6 is an example of a networked peripheral device (NPD) listing that includes, for example, manufacturers and models for a variety of consumer electronics (e.g., VCR, DVD player, MP3 player, etc.).

FIG. 6 is an example of a networked peripheral device (NPD) listing 600 that includes, for example, manufacturers and models for a variety of consumer electronics (e.g., VCR, DVD player, MP3 player, camcorder, etc.). Prior to control of the peripheral device 405, a user selects the coupled peripheral device 405 from the list 600 that is stored in the primary device 410. Once selected, the processor 230 is updated to include the peripheral device's specifications in order to transmit appropriate commands. A preferred embodiment is to access the peripheral device listing 600 by, for example, selecting a "Settings" button on the remote control or a "Settings" menu on the interactive program guide (IPG). The manufacturer and model of the peripheral device 405 is selected from the list 600 of stored models and then saved for future access by the processor 230. By way of example, the user can implement the arrows 610 via the remote control until the correct manufacturer is highlighted. In this case, the user can then select, for example, a Toshiba DVD player 615.

Figure 7:
FIG. 7 is an example of an interactive program guide including a channel for the networked peripheral device (NPD) menu (i.e., Toshiba DVD menu).

FIG. 7 is an example of an interactive program guide 700 including a channel for the networked peripheral device (NPD) screen (e.g., Toshiba DVD screen) 715. Notably, the interactive program guide 700 can be updated via the processor 230 to include the selected manufacturer of the peripheral device 405 that can subsequently be accessed by all remote devices 215-$n$. By way of example, in accordance with the present invention, the primary device 410 receives reverse command signals from one or a plurality of remote devices 215-$n$ indicating a request for the IPG 700. From the IPG 700, a user can subsequently select the NPD screen 715 that may display operating commands for the device 405, among other listings associated with the particular peripheral device 405. For example, the screen may also include the title(s) of the cassette or disc, if programmed into the processor 230, that is currently installed or playing in the peripheral device 405.

Figure 8:
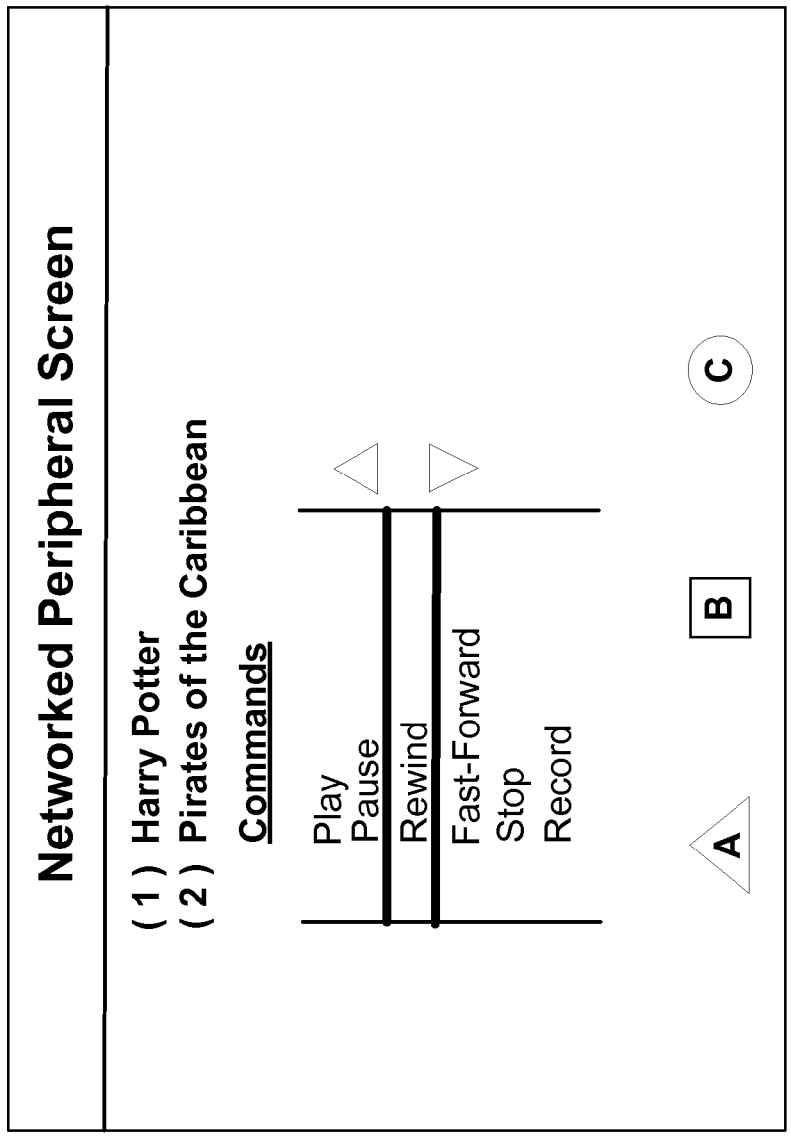
FIG. 8 illustrates an example of the NPD screen that the user may use from any of the receiving devices in order to control the networked peripheral device.

FIG. 8 illustrates an example of the NPD screen 800 that the user may use from any of the receiving devices 410, 215-$n$ in order to control the networked peripheral device 405. From the NPD screen 800, the user may select a disc in the case where there are numerous discs in a DVD player, for example, and choose to play the selected presentation. Furthermore, additional operating options on the screen may include play, pause, fast-forward, stop, etc. Alternatively, the remote control may include buttons representing play, stop, record, etc. In this case, the remote device 215-$n$ can be programmed to accept these operations directly from the remote control and send reverse command signals accordingly. The remote device 215-$n$ sends the selected reverse command signal that is indicative of the operating command to the primary device 410. Subsequently, the remote device command receiver 250 (FIG. 4) and the processor 230 process the signals according to the selection. An appropriate IR signal is then provided from the processor 230 via the IR port 510 to the sensor 520. Further information regarding a multi-room interactive program guide can be found in co-pending U.S. patent application Ser. No. 10/403,485, filed on Mar. 31, 2003, the disclosure and teachings of which are hereby included by reference.

Referring again to FIG. 5, a peripheral processor 525 receives the IR signals indicating the requested command signals and provides operating signals accordingly. A media presentation device 530 receives the operating signals and, for example, reads and transmits the media presentation signals that have been recorded onto a media presentation (e.g., a cassette, disc, or hard-drive). If the media presentation signals have been digitally compressed and stored on, for example, a disc, the digitally compressed signals are typically provided to an MPEG decoder 535. More specifically, in accordance with certain copyrights that have been obtained by, for example, movie producers, the media presentation signals must be decoded to an analog or NTSC (National Television Standards Committee) signal. In this manner, an MPEG decoder 535 decodes the media presentation and provides the analog signals via an output port 540 of the peripheral device 405 to an input port 545 of the primary device 410. Furthermore, when an analog signal is received from the peripheral device 405, an analog to digital converter (ADC) digitizes the analog signal and an encoder 550 (e.g., an MPEG (Moving Pictures Experts Group encoder) subsequently encodes, or digitally compresses, the analog signal for transmission throughout the network system 400.

It is envisioned that the peripheral device 405 can provide signals in any format. For example, the primary device 410 may receive signals in an analog video format (including standard definition and high definition), uncompressed digital video (including DVI, and HDMI), and compressed digital video (MPEG-2 or DV (digital video)), for example. The primary device 410 distinguishes the signal format by the connector that connects the peripheral device 405 with the primary device 410. By way of example, analog signals use a baseband or high-definition input port (e.g., connector 545). A DVI (digital video interface) connector 555 carries uncompressed digital video. Furthermore, a Firewire connector (IEEE 1394) 560 conveys compressed digital video (in either MPEG-2 or DV format). The primary device 410 can, therefore, use the connector type information to determine whether the incoming video needs to be digitized and/or compressed. Additionally, the processor 230 has access to the Firewire connector 360 and understands that the incoming signals are compressed digital signals. Once the signals are available in compressed digital format, the signals are transmitted to the modulator 245 for modulation or the storage device 240 for storage.

Subsequently, the modulator 240 modulates the media presentation signals and the UHF converter 260 converts the signals to a higher frequency. The signals are then provided to the SIM 210 for routing to the remote device 215-n. Additionally, the user may wish to store the media presentation signals on the storage device 240. Accordingly, the reverse command signals are processed and the processor 230 instructs the media presentation signals to be routed to the storage device 240. Further information regarding the storage device 240 and routing stored media presentation signals to any one or more remote devices 215-n is detailed in copending U.S. patent application Ser. No. 10/342,670 filed on Jan. 15, 2003.

Accordingly, systems and methods have been provided that allow remote devices in a network operate a networked peripheral device. In other words, a user need only purchase one peripheral device that can be used from any device in the network. It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A home communication system, comprising:
   a networked peripheral device operatively connected to a first set-top terminal, the networked peripheral device configured to store a media presentation, wherein the first set-top terminal comprises a processor configured to update an interactive program guide (IPG), the IPG being accessible by other set-top terminal in the home communication network, to include the networked peripheral device;
   a second set-top terminal coupled to the first set-top terminal over the home communications network via a splitter/isolator module (SIM), the second set-top terminal configured to receive the media presentation from the networked peripheral device responsive to a user request for access to the media presentation; and
   a user interface screen for the networked peripheral device displayed on a display device accessible by the user of the second set-top terminal, wherein the user interface screen for the networked peripheral device is displayed in response to the user selecting the networked peripheral device for playback on the interactive program guide, wherein the user interface screen comprises a plurality of operating commands for the networked peripheral device, wherein the media presentation is currently playing in the networked peripheral device, the user interface screen configured to enable the user of the second set-top terminal to select at least one operating command from the plurality of operating commands, wherein the at least one operating command is received at the first set-top terminal as reverse command signal, and wherein the processor at the first set top terminal is configured to process the received reverse command signal to generate a control function for the networked peripheral device.

2. The system of claim 1, wherein the first set-top terminal and the second set-top terminal are co-located in a subscriber premise.

3. The system of claim 2, wherein the second set-top terminal resides in a room of the subscriber premise separate from a room where the first set-top terminal resides.

4. The system of claim 1, wherein the plurality of operating commands include play, pause, rewind, and fast-forward.

5. The system of claim 1, wherein the first set-top terminal and the second set-top terminal each comprise a tuner.

6. The system of claim 1, wherein the second set-top terminal is configured to receive the media presentation transmitted over the broadband network.

7. The system of claim 1, wherein the first set top terminal further comprising an encoder, the processor for instructing the encoder to digitally compress the media presentation prior to routing to the second set-top terminal requesting media presentation.

8. The system of claim 1, wherein the first set-top terminal further comprising a modulator for modulating the media presentation signals to a predetermined frequency and for providing modulated signals to the second set-top terminal.

9. The system of claim 1, wherein the networked peripheral device is a DVD player, and wherein the at least one operating command comprises selecting a disc from a plurality of discs in the DVD player.

10. A method, comprising:
    receiving at a primary device broadband signals including a media presentation;

storing the media presentation at a peripheral device associated with the primary device;

updating an interactive program guide (IPG) to include the peripheral device (IPG), the IPG being accessible by other set-top terminals in a home communication network;

displaying a user interface screen on a display device accessible by the user of a secondary device, in response to the user selecting the peripheral device on the interactive program guide, wherein the user interface screen comprises a plurality of operating commands for the peripheral device and a title of the media presentation, wherein the media presentation is currently playing in the peripheral device, the user interface screen configured to enable the user of the secondary device to select the media presentation for playback;

receiving a request from the secondary device for access to the media presentation;

providing the media presentation over the home communications network via the splitter/isolator module (SIM), to the secondary device directly responsive to the request;

receiving at least one operating command from the plurality of operating commands from the user, wherein the at least one operating command is received at the primary device as reverse command signal; and processing the received reverse command signal, at the primary device to generate a control function for the peripheral device.

11. The method of claim 10, wherein providing comprises transmitting the media presentation from a first room to a second room in a subscriber premise.

12. The method of claim 11, wherein the first room is separate from the second room.

13. The method of claim 10, wherein receiving at the primary device further comprises receiving telephony signals.

14. The method of claim 10, further comprising providing a displayed list that includes names of a plurality of peripheral device manufacturers and model identifiers of a corresponding plurality of peripheral devices, the displayed list enabling a user to choose a peripheral device from the list that corresponds to the peripheral device associated with the primary device.

15. The method of claim 10, further comprising providing an interactive program guide that is populated with scheduled media presentations available for presentation, the interactive program guide further comprising:

channel identifiers and plural time indexes corresponding to time of presentation of the media presentations; and at least one of the channel identifiers corresponding to an identifier of the peripheral device.

16. The method of claim 10, wherein receiving the request from the set-top terminal for access to the media presentation is directly responsive to user input.

17. The method of claim 10, wherein the primary device comprises a set-top terminal.

18. The method of claim 10, wherein the peripheral device is configured to record and playback the media presentation.

19. The method of claim 10, wherein the peripheral device comprises one of a VCR, MP3 player, and a camcorder.

20. A system, comprising:

a computer having an integrated storage device, the storage device configured to store a plurality of media presentations transmitted over a broadband network;

a set-top terminal coupled to the computer over a home communications network via a splitter/isolator module (SIM), the set-top terminal configured to receive at least one of the plurality of media presentations over the home communications network via the splitter/isolator module (SIM) from the computer and effect playback of the at least one of the plurality of media presentations responsive to a user request for playback of the at least one of the plurality of media presentations, wherein the set-top terminal is further configured to update an interactive program guide (IPG), the IPG being accessible by other set-top terminals in the home communication network; and a user interface screen displayed on a display device accessible by the user of the set-top terminal, wherein the user interface screen comprises a plurality of operating commands for the storage device and a title of the at least one of the plurality of media presentations, wherein the at least one of the plurality of media presentations is currently playing in the peripheral device, the user interface screen configured:

to enable the user of the set-top terminal to select the at least one of the plurality of media presentations for playback, and to enable the user of the set-top terminal to select at least one operating command from the plurality of operating commands, wherein the at least one operating command is received at the computer as reverse command signal, and wherein the computer is configured to process the received reverse command signal to generate a control function for the integrated storage device.

\* \* \* \* \*